(12) United States Patent
Park et al.

(10) Patent No.: US 12,066,689 B2
(45) Date of Patent: *Aug. 20, 2024

(54) LENS DRIVING UNIT, AND A CAMERA MODULE AND AN OPTICAL APPLIANCE INCLUDING THE SAME

(71) Applicant: LG INNOTEK CO., LTD., Seoul (KR)

(72) Inventors: Tae Bong Park, Seoul (KR); Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,368

(22) Filed: Apr. 18, 2023

(65) Prior Publication Data

US 2023/0251454 A1   Aug. 10, 2023

Related U.S. Application Data

(63) Continuation of application No. 17/649,988, filed on Feb. 4, 2022, now Pat. No. 11,662,546, which is a
(Continued)

(30) Foreign Application Priority Data

| Sep. 21, 2015 | (KR) | 10-2015-0133180 |
| Sep. 24, 2015 | (KR) | 10-2015-0135403 |
| Sep. 24, 2015 | (KR) | 10-2015-0135404 |

(51) Int. Cl.
*G02B 7/08* (2021.01)
*G02B 27/64* (2006.01)
(Continued)

(52) U.S. Cl.
CPC .............. *G02B 7/08* (2013.01); *G02B 27/646* (2013.01); *H01F 7/064* (2013.01); *H04N 23/50* (2023.01);
(Continued)

(58) Field of Classification Search
CPC ........ H04N 23/50; H04N 23/54; H04N 23/57; H04N 23/67; H04N 23/687; G02B 7/08;
(Continued)

(56) References Cited

U.S. PATENT DOCUMENTS

| 8,670,195 B2 | 3/2014 | Ikushima et al. |
| 10,082,638 B2 | 9/2018 | Park et al. |

(Continued)

FOREIGN PATENT DOCUMENTS

| CN | 102819086 A | 12/2012 |
| CN | 103837946 A | 6/2014 |

(Continued)

OTHER PUBLICATIONS

Non-Final Office Action dated Jan. 17, 2018 in U.S. Appl. No. 15/271,955.
(Continued)

*Primary Examiner* — Kelly L Jerabek
(74) *Attorney, Agent, or Firm* — Saliwanchik, Lloyd & Eisenschenk

(57) ABSTRACT

Embodiments provide a lens driving unit including a base, a housing supported so as to be movable relative to the base, a magnet located on the housing, a pattern coil part including a pattern coil that is located opposite the magnet, the pattern coil part being located on the base, and a sensor part mounted to the pattern coil part for sensing a position or movement of the housing, and the pattern coil part includes a first layer and a second layer stacked on the first layer, the sensor part being mounted underneath the first layer, and the pattern coil being formed on the second layer. Thereby, manufacturing costs may be reduced owing to a reduction in the number of elements, processes, and process management points.

20 Claims, 10 Drawing Sheets

Related U.S. Application Data continuation of application No. 17/138,163, filed on Dec. 30, 2020, now Pat. No. 11,275,228, which is a continuation of application No. 16/668,931, filed on Oct. 30, 2019, now Pat. No. 10,908,382, which is a continuation of application No. 16/110,736, filed on Aug. 23, 2018, now Pat. No. 10,502,923, which is a continuation of application No. 15/271,955, filed on Sep. 21, 2016, now Pat. No. 10,082,638.

(51) Int. Cl.
| | |
|---|---|
| H01F 7/06 | (2006.01) |
| H04N 23/50 | (2023.01) |
| H04N 23/54 | (2023.01) |
| H04N 23/57 | (2023.01) |
| H04N 23/67 | (2023.01) |
| H04N 23/68 | (2023.01) |

(52) U.S. Cl.
CPC ............. *H04N 23/54* (2023.01); *H04N 23/57* (2023.01); *H04N 23/67* (2023.01); *H04N 23/687* (2023.01)

(58) Field of Classification Search
CPC .......... G02B 27/646; G02B 7/09; G03B 5/00; G03B 13/36; H01F 7/064
See application file for complete search history.

(56) References Cited

U.S. PATENT DOCUMENTS

| | | | |
|---|---|---|---|
| 10,502,923 B2 | 12/2019 | Park et al. | |
| 10,908,382 B2 | 2/2021 | Park et al. | |
| 11,275,228 B2 | 3/2022 | Park et al. | |
| 11,662,546 B2 * | 5/2023 | Park | H04N 23/54 348/374 |
| 2010/0284081 A1 | 11/2010 | Gutierrez et al. | |
| 2011/0097062 A1 | 4/2011 | Tsuruta et al. | |
| 2012/0008221 A1 | 1/2012 | Min et al. | |
| 2012/0099201 A1 | 4/2012 | Chan et al. | |
| 2012/0229901 A1 | 9/2012 | Moriya et al. | |
| 2012/0307088 A1 | 12/2012 | Han | |
| 2013/0044383 A1 | 2/2013 | Park et al. | |
| 2013/0076924 A1 | 3/2013 | Wade et al. | |
| 2013/0119785 A1 | 5/2013 | Han | |
| 2013/0136438 A1 * | 5/2013 | Lee | G02B 7/08 359/811 |
| 2013/0314792 A1 | 11/2013 | Hu et al. | |
| 2014/0192260 A1 | 7/2014 | Oh | |
| 2014/0327790 A1 | 11/2014 | Kim et al. | |
| 2015/0022891 A1 | 1/2015 | Hu et al. | |
| 2015/0153539 A1 | 6/2015 | Yoo et al. | |
| 2015/0253583 A1 | 9/2015 | Cho et al. | |
| 2017/0115463 A1 | 4/2017 | Osaka et al. | |

FOREIGN PATENT DOCUMENTS

| | | |
|---|---|---|
| CN | 104698566 A | 6/2015 |
| CN | 104808416 A | 7/2015 |
| CN | 104902149 A | 9/2015 |
| JP | 2002-229090 A | 8/2002 |
| JP | 2009-230025 A | 10/2009 |
| JP | 2013-24938 A | 2/2013 |
| JP | 2014-85624 A | 5/2014 |
| JP | 2014-219675 A | 11/2014 |
| JP | 2015-34911 A | 2/2015 |
| KR | 10-0947974 B1 | 3/2010 |
| KR | 10-0952488 B1 | 4/2010 |
| KR | 10-2013-0132089 A | 12/2013 |
| KR | 10-2015-0008662 A | 1/2015 |
| KR | 10-2015-0022637 A | 3/2015 |
| KR | 10-2015-0031004 A | 3/2015 |
| KR | 10-2015-0051775 A | 5/2015 |
| KR | 10-2015-0104388 A | 9/2015 |
| WO | 2006/083670 A1 | 8/2006 |
| WO | 2014/069251 A1 | 5/2014 |
| WO | 2015/102382 A1 | 7/2015 |
| WO | 2015/130051 A1 | 9/2015 |

OTHER PUBLICATIONS

Notice of Allowance dated May 23, 2018 in U.S. Appl. No. 15/271,955.
Notice of Allowance dated Jul. 31, 2019 in U.S. Appl. No. 16/110,736.
Office Action dated Oct. 13, 2020 in Japanese Application No. 2016-183948.
Office Action dated May 18, 2020 in U.S. Appl. No. 16/668,931.
Notice of Allowance dated Oct. 1, 2020 in U.S. Appl. No. 16/668,931.
Office Action dated May 11, 2021 in Chinese Application No. 201610839216.6.
Office Action dated Dec. 14, 2021 in Japanese Application No. 2016-183948.
Office Action dated Jul. 14, 2021 in U.S. Appl. No. 17/138,163.
Notice of Allowance dated Nov. 4, 2021 in U.S. Appl. No. 17/138,163.
Office Action dated Aug. 10, 2022 in Korean Application No. 10-2015-0133180.
Office Action dated Aug. 11, 2022 in Korean Application No. 10-2015-0135403.
Notice of Allowance dated Nov. 1, 2022 in Japanese Application No. 2016-183948.
Office Action dated Dec. 13, 2022 in Japanese Application No. 2022-066319.
Office Action dated Sep. 12, 2022 in U.S. Appl. No. 17/649,988.
Notice of Allowance dated Jan. 19, 2023 in U.S. Appl. No. 17/649,988.
Office Action dated Sep. 28, 2023 in Chinese Application No. 202111395674.2.
Office Action dated Sep. 28, 2023 in Chinese Application No. 202111370327.4.

* cited by examiner

LENS DRIVING UNIT, AND A CAMERA MODULE AND AN OPTICAL APPLIANCE INCLUDING THE SAME

CROSS-REFERENCE TO RELATED APPLICATIONS

This application is a continuation of U.S. application Ser. No. 17/649,988, filed Feb. 4, 2022; which is a continuation of U.S. application Ser. No. 17/138,163, filed Dec. 30, 2020, now U.S. Pat. No. 11,275,228, issued Mar. 15, 2022; which is a continuation of U.S. application Ser. No. 16/668,931, filed Oct. 30, 2019, now U.S. Pat. No. 10,908,382, issued Feb. 2, 2021; which is a continuation of U.S. application Ser. No. 16/110,736, filed Aug. 23, 2018, now U.S. Pat. No. 10,502,923, issued Dec. 10, 2019; which is a continuation of U.S. application Ser. No. 15/271,955, filed Sep. 21, 2016, now U.S. Pat. No. 10,082,638, issued Sep. 25, 2018; which claims the benefit under 35 U.S.C. § 119 of Korean Patent Application Nos. 10-2015-0133180, filed Sep. 21, 2015; 10-2015-0135403, filed Sep. 24, 2015; and 10-2015-0135404, filed Sep. 24, 2015, which are hereby incorporated by reference in their entirety.

TECHNICAL FIELD

Embodiments relate to a lens driving unit, a camera module, and an optical appliance.

BACKGROUND

The following disclosure merely provides background information related to the embodiments and does not describe the related art.

As various kinds of portable terminals have become widely generalized and popularized and wireless Internet service is commercialized, consumer demand related to portable terminals has been diversified, and therefore various kinds of additional devices have been mounted to portable terminals.

A representative one of these additional devices is a camera module that captures a still or moving image of an object.

Recent camera modules include an Optical Image Stabilization (OIS) actuator for a hand tremor compensation function, and there is need for a reduced height of the entire module and a simplified manufacturing process thereof.

Conventional camera modules have a high price and a large number of manufacturing processes due to the great number of elements thereof, and an increase in process management points upon the manufacture of a product results in increased manufacturing costs and an increased height of the entire product.

In addition, because a printed circuit board and a circuit member have different sizes, the printed circuit board may be warped when the circuit member is assembled to one surface of the printed circuit board, which deteriorates the quality of the camera module.

In addition, a gap may be generated between a pad unit provided on one surface of the printed circuit board and a base to which the printed circuit board is assembled, thus causing contact failure.

In addition, when only the pad unit is provided on one surface of the printed circuit board, a portion of a pad may be separated from the printed circuit board during soldering, which causes deterioration in the quality of the camera module.

In addition, the printed circuit board may be provided on one surface of the base and the circuit member may be provided on one surface of the printed circuit board. When the base, the printed circuit board, and the circuit member are sequentially assembled with one another, the circuit member does not come into contact with the base, which may make the height of the circuit member uneven.

In addition, when a pattern, which protrudes from the pad provided on one surface of the printed circuit board, is thin, the pad may be cracked by an external shock.

The circuit member may be assembled so as to be disposed on the upper surface of the printed circuit board.

In the process of assembling the circuit member so as to be disposed on the top of the printed circuit board, the circuit member may be slightly tilted.

When the circuit member is tilted, rather than being evenly disposed on the upper surface of the printed circuit board, the resolution of the camera module may be deteriorated.

In addition, because a conventional lens driving apparatus is configured such that the circuit member and the printed circuit board are assembled with each other, rather than integrally forming the circuit member and the printed circuit board, a foreign substance may be introduced between the circuit member and the printed circuit board, thus causing deterioration in the resolution of the camera module.

BRIEF SUMMARY

Embodiments provide a lens driving unit, which achieves a reduction in the number of elements, the number of processes, the number of process management points, and the height of an entire product.

In addition, embodiments provide a camera module and an optical appliance, each of which includes a lens driving unit.

In addition, embodiments provide a lens driving apparatus and a camera module including the same, which may inhibit deterioration in the quality of the camera module due to warping of a printed circuit board, which is caused when a circuit member is assembled to one surface of the printed circuit board because the printed circuit board and the circuit member have different sizes.

In addition, embodiments provide a lens driving apparatus and a camera module including the same, which may inhibit contact failure due to a gap between a pad unit provided on one surface of a printed circuit board and a base to which the printed circuit board is assembled.

In addition, embodiments provide a lens driving apparatus and a camera module including the same, which may inhibit deterioration in the quality of the camera module due to the separation of a portion of a pad from a printed circuit board during soldering in the case where only a pad unit is provided on one surface of the printed circuit board.

In addition, embodiments provide a lens driving apparatus and a camera module including the same, which may inhibit a circuit member from having an irregular height because it does not come into contact with a base when the circuit member, the base, and a printed circuit board are sequentially assembled with one another so that the printed circuit board is provided on one surface of the base and the circuit member is provided on one surface of the printed circuit board.

In addition, embodiments provide a lens driving apparatus and a camera module including the same, which may inhibit a pattern, which protrudes from a pad provided on one surface of a printed circuit board, from being cracked by an external shock when the pattern is thin.

In addition, embodiments provide a lens driving apparatus and a camera module including the same, which may inhibit a circuit member from being slightly tilted in the process of assembling the circuit member so as to be disposed on the top of a printed circuit board.

In addition, embodiments provide a lens driving apparatus and a camera module including the same, which may inhibit deterioration in the resolution of the camera module when a circuit member is tilted, rather than being evenly disposed on the upper surface of a printed circuit board.

In addition, embodiments provide a lens driving apparatus and a camera module including the same, which may inhibit deterioration in the resolution of the camera module due to the introduction of a foreign substance between a circuit member and a printed circuit board because the circuit member and the printed circuit board are assembled with each other, rather than being integrally formed with each other.

In one embodiment, a lens driving unit includes a base, a housing supported so as to be movable relative to the base, a magnet located on the housing, a pattern coil part including a pattern coil that is located opposite the magnet, the pattern coil part being located on the base, and a sensor part mounted to the pattern coil part for sensing a position or movement of the housing, wherein the pattern coil part includes a first layer and a second layer stacked on the first layer, the sensor part being mounted underneath the first layer, and the pattern coil being formed on the second layer.

The pattern coil part may include a body provided with the pattern coil, and a terminal portion bent from the body so as to extend downward.

The sensor part may be located so as not to overlap the pattern coil in an optical-axis direction.

The body may include a through-hole formed in a center thereof, the pattern coil may include first to fourth coil pieces located around the through-hole, the first coil piece and the third coil piece may be located opposite each other, and the second coil piece and the fourth coil piece may be located opposite each other. The first coil piece and the second coil piece may have the same shape, and the third coil piece and the fourth coil piece may have the same shape. The first coil piece and the third coil piece may have different shapes.

The sensor part may be located so as to overlap the pattern coil in an optical-axis direction, and the pattern coil part may further include a third layer located between the first layer and the second layer.

The base or the body may support the housing from a bottom side thereof so that the housing is horizontally moved or tilted.

The lens driving unit may further include a lateral support member coupled at one end thereof to the housing, and the lateral support member may have a remaining end coupled to the body.

The lateral support member may include a wire, and the body may include a coupling hole for penetration of the wire, and an electrical conduction portion formed on a lower surface of the body so as to come into contact with the coupling hole.

The base may include a sensor part accommodation recess formed in an upper surface thereof for accommodating therein the sensor part.

The sensor part may include a hall sensor for sensing magnetic force of the magnet, and the hall sensor may be mounted to the pattern coil part via a Surface Mount Technology (SMT).

The lens driving unit may further include a bobbin located inside the housing, a coil located on the bobbin so as to be opposite the magnet, and an upper support member and a lower support member that are coupled to the bobbin and the housing for supporting the bobbin so as to be movable relative to the housing.

The upper support member may be divided into six upper electrical conduction parts, and the lower support member may be divided into two lower electrical conduction parts. Four electrical conduction parts among the six upper electrical conduction parts may conduct electricity together with an auto-focusing feedback sensor located on the bobbin, and two remaining electrical conduction parts among the six upper electrical conduction parts may be connected to the two lower electrical conduction parts via an electrical conduction member so as to conduct electricity together with the coil located on the bobbin.

The lens driving unit may further include a cover member for accommodating therein the housing, the cover member having a lower end coupled to the base, and the cover member may include a cutaway portion for exposing the terminal portion to an outside.

The terminal portion may be accommodated in a terminal accommodation portion formed in a portion of a side surface of the base.

The terminal portion may be located on each of opposite lateral sides of the body.

In another embodiment, a camera module includes a base, a housing supported so as to be movable relative to the base, a magnet located on the housing, a pattern coil part including a pattern coil that is located opposite the magnet, the pattern coil part being located on the base, and a sensor part mounted to the pattern coil part for sensing a position or movement of the housing, wherein the pattern coil part includes a first layer and a second layer stacked on the first layer, the sensor part being mounted underneath the first layer, and the pattern coil being formed on the second layer.

In another embodiment, an optical appliance includes a main body, a display unit disposed on one surface of the main body for displaying information, and a camera module installed to the main body for capturing an image or photograph, wherein the camera module includes a base, a housing supported so as to be movable relative to the base, a magnet located on the housing, a pattern coil part including a pattern coil that is located opposite the magnet, the pattern coil part being located on the base, and a sensor part mounted to the pattern coil part for sensing a position or movement of the housing, wherein the pattern coil part includes a first layer and a second layer stacked on the first layer, the sensor part being mounted underneath the first layer, and the pattern coil being formed on the second layer.

In another embodiment, a lens driving apparatus includes a first lens driving unit including a bobbin provided with at least one lens sheet therein and a first coil on an outer circumferential surface thereof, a first magnet located around the bobbin so as to be opposite the first coil, a housing for supporting the first magnet, and upper and lower elastic members that are coupled to the bobbin and the housing, the first lens driving unit moving the bobbin in a first direction, which is parallel to an optical axis, via interaction between the first magnet and the first coil, and a second lens driving unit including a base spaced apart from the first lens driving unit by a predetermined distance, a plurality of support members for supporting the housing so as to be movable relative to the base in second and third directions, which are orthogonal to the first direction, a second coil located so as to be opposite the first magnet, and a printed circuit board disposed on one surface of the base via an adhesive member, the second lens driving unit moving the housing in the second and third directions via interaction between the first magnet and the second coil, wherein the printed circuit board includes a plurality of terminals provided on one surface thereof, and a coating member for covering a portion of opposite side surfaces of each of the terminals.

The terminals may be spaced apart from one another by a first length on the surface of the printed circuit board.

The first length may range from 0.01 µM to 0.45 µm.

The coating member may be integrally provided on one surface of two or more of the terminals.

The terminals may include first terminals located on opposite ends of the printed circuit board, and a second terminal located between the first terminals.

The coating member may be provided to cover one side surface of each first terminal and opposite side surfaces of the second terminal.

The coating member may be formed of a Photo Solder Resist (PSR) or cover layer material.

The printed circuit board may have a hollow shape and may include at least one protruding hollowed portion, which protrudes radially outward from a center of the printed circuit board.

The lens driving apparatus may further include a circuit member having the second coil, and the circuit member may have the same diagonal length in the first direction as the diagonal length of the printed circuit board in the first direction.

The circuit member may have the same diagonal length in the second direction, which crosses the first direction, as the diagonal length of the printed circuit board in the second direction.

In another embodiment, a camera module includes a lens driving apparatus, the lens driving apparatus including a first lens driving unit including a bobbin provided with at least one lens sheet therein and a first coil on an outer circumferential surface thereof, a first magnet located around the bobbin so as to be opposite the first coil, a housing for supporting the first magnet, and upper and lower elastic members that are coupled to the bobbin and the housing, the first lens driving unit moving the bobbin in a first direction, which is parallel to an optical axis, via interaction between the first magnet and the first coil, and a second lens driving unit including a base spaced apart from the first lens driving unit by a predetermined distance, a plurality of support members for supporting the housing so as to be movable relative to the base in second and third directions, which are orthogonal to the first direction, a second coil located so as to be opposite the first magnet, and a printed circuit board disposed on one surface of the base via an adhesive member, the second lens driving unit moving the housing in the second and third directions via interaction between the first magnet and the second coil, wherein the printed circuit board includes a plurality of terminals provided on one surface thereof, and a coating member for covering a portion of opposite side surfaces of each of the terminals, an image sensor, and a circuit board on which the image sensor is mounted.

The terminal may have a thickness of 400 µm or more.

The printed circuit board may have a hollow shape and may include at least one protruding hollowed portion, which protrudes radially outward from a center of the printed circuit board.

The lens driving apparatus may further include a circuit member having the second coil, and the circuit member may have the same diagonal length in the first direction as the diagonal length of the printed circuit board in the first direction.

The coating member may be formed of a Photo Solder Resist (PSR) or cover layer material.

The coating member may be provided to cover a portion of an upper surface of each terminal.

In another embodiment, a lens driving apparatus includes a first lens driving unit including a bobbin provided with at least one lens sheet therein and a first coil on an outer circumferential surface thereof, a first magnet located around the bobbin so as to be opposite the first coil, a housing for supporting the first magnet, and upper and lower elastic members that are coupled to the bobbin and the housing, the first lens driving unit moving the bobbin in a first direction that follows an optical axis via interaction between the first magnet and the first coil, and a second lens driving unit including a base spaced apart from the first lens driving unit by a predetermined distance, a plurality of support members for supporting the housing so as to be movable relative to the base in second and third directions, which are orthogonal to the first direction, a second coil located so as to be opposite the first magnet, and a circuit member disposed on one surface of the base via an adhesive member, the second lens driving unit moving the housing in the second and third directions via interaction between the first magnet and the second coil, wherein the circuit member includes a first circuit board unit including at least one pattern for electrically connecting the circuit member and a controller to each other, a second circuit board unit disposed on a top of the first circuit board unit, and a third circuit board unit disposed on a bottom of the first circuit board unit, and wherein each of the first circuit board unit, the second circuit board unit, and the third circuit board unit includes the second coil, such that the circuit member and the second coil are integrally formed with each other.

The first circuit board unit may include a plurality of circuit boards, and may further include a terminal that is electrically connected to the controller.

Each of the second circuit board unit and the third circuit board unit may include at least one circuit board.

No second coil may be formed on a lowermost circuit board of the third circuit board unit, and a position sensor may be mounted on a portion corresponding to a position of the second coil.

Each of the second coils provided on the first circuit board unit, the second circuit board unit, and the third circuit board unit may be wound to have five turns or more.

The circuit member may include at least six circuit boards.

One of the six circuit boards may include no second coil, and may include a position sensor on a portion thereof corresponding to a position of the second coil.

The circuit boards may be formed of a Flexible Printed Circuit Board (FPCB).

In another embodiment, a camera module may include the lens driving apparatus of the above embodiment, the image sensor, and a sensor board on which the image sensor is mounted.

In a further embodiment, the lens driving apparatus includes a first lens driving unit including a bobbin provided with at least one lens sheet therein and a first coil on an outer circumferential surface thereof, a first magnet located around the bobbin so as to be opposite the first coil, a housing for supporting the first magnet, and upper and lower elastic members that are coupled to the bobbin and the housing, the first lens driving unit moving the bobbin in a first direction that follows an optical axis via interaction between the first magnet and the first coil, and a second lens driving unit including a base spaced apart from the first lens driving unit by a predetermined distance, a plurality of support members for supporting the housing so as to be movable relative to the base in second and third directions, which are orthogonal to the first direction, a circuit member disposed on one surface of the base via an adhesive member, a circuit board unit disposed on a lower surface of the circuit member, and a second coil wound on the circuit member and/or the circuit board unit, the second lens driving unit moving the housing in the second and third directions via interaction between the first magnet and the second coil, and the circuit board unit and the circuit member being integrally formed with each other.

The circuit board unit may include a first circuit board unit including at least one pattern for electrically connecting the circuit board unit and a controller to each other, and a second circuit board unit disposed on the first circuit board unit.

The circuit member may include a first circuit member, a second circuit member located below the first circuit member, a third circuit member located below the second circuit member, and a fourth circuit member located below the third circuit member.

The circuit board unit may be located between the second circuit member and the third circuit member.

No second coil may be wound on at least one of the circuit members.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
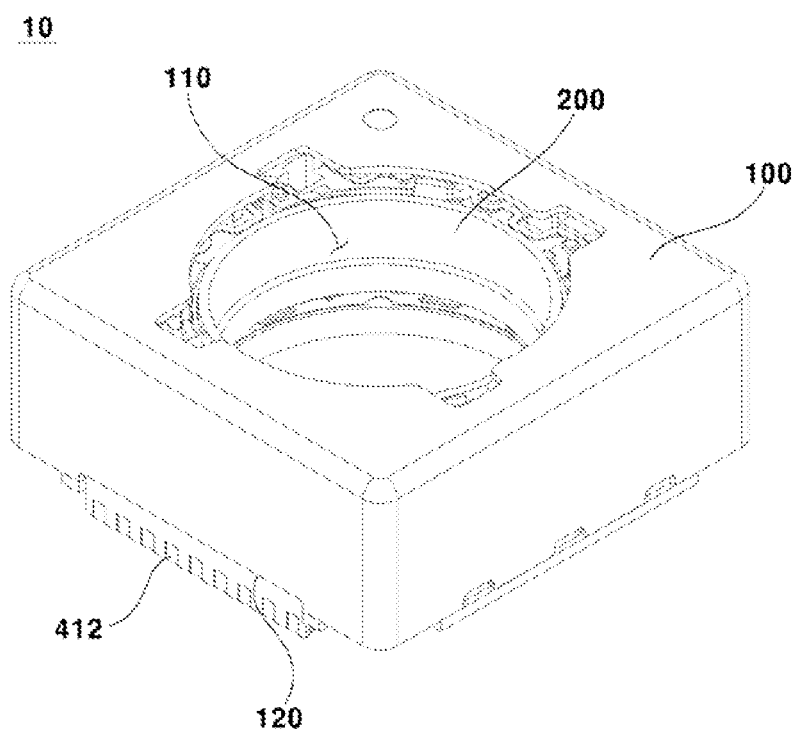
FIG. 1 is a perspective view illustrating a lens driving unit according to an embodiment.

Hereinafter, some embodiments will be clearly revealed via description thereof with reference to the accompanying drawings. Wherever possible, the same reference numbers will be used throughout the drawings to refer to the same or like parts. In addition, in the following description of the embodiments, a detailed description of known functions and configurations incorporated herein will be omitted when it may impede the understanding of the embodiments.

In addition, in the description of constituent elements of the embodiments, terms "first", "second", "A", "B", "(a)", "(b)", and the like may be used to distinguish any one element from another element without requiring or containing any physical or logical relationship or sequence between these substances or elements. When an element is described as being "connected" or "coupled", to another element, it can be directly connected or coupled to the other element, or intervening elements may also be "connected" or "coupled" therebetween.

The expression "optical-axis direction" used below is defined as the optical axis of a lens module, which is coupled to a lens driving unit. Meanwhile, "optical-axis direction" may be replaced with the vertical direction, the Z-axis direction, or the like.

The term "auto-focusing function" used below is defined as a function of focusing on an object by moving a lens module in the optical-axis direction so as to adjust the distance to an image sensor depending on the distance to the object, in order to allow the image sensor to acquire a clear image of the object.

The term "hand tremor compensation function" used below is defined as a function of moving or tilting a lens module in a direction perpendicular to the optical-axis direction so as to compensate for vibrations (movement) of an image sensor generated by external force. Meanwhile, "hand tremor compensation" may be used along with "Optical Image Stabilization (OIS)".

Hereinafter, the configuration of an optical appliance according to the present embodiment will be described.

The optical appliance according to the present embodiment may be, for example, a cellular phone, a smart phone, a portable smart appliance, a digital camera, a laptop computer, a digital broadcasting terminal, a Personal Digital Assistant (PDA), a Portable Multimedia Player (PMP), or a navigation system, without being limited thereto, and may be any one device for capturing an image or a photograph.

The optical appliance according to the present exemplary embodiment may include a main body (not illustrated), a display unit (not illustrated) disposed on one surface of the main body for displaying information, and a camera (not illustrated) installed on the main body to capture an image or a photograph, the camera including a camera module (not illustrated).

Hereinafter, the configuration of the camera module according to the present embodiment will be described.

The camera module may include a lens driving unit 10, a lens module (not illustrated), an infrared-ray blocking filter (not illustrated), a printed circuit board (not illustrated), an image sensor (not illustrated), and a controller (not illustrated).

The lens module may include one or more lenses (not illustrated), and a lens barrel for accommodating the lenses. One constituent element of the lens module is not limited to the lens barrel, and any other holder structure capable of supporting the lenses may be used. The lens module may be coupled to the lens driving unit 10 and may be moved along with the lens driving unit 10. In one example, the lens module may be coupled inside the lens driving unit 10. In one example, the lens module may be screwed to the lens driving unit 10. In another example, the lens module may be coupled to the lens driving unit 10 using an adhesive (not illustrated). Light that has passed through the lens module may be emitted to the image sensor.

The infrared-ray blocking filter may inhibit infrared rays from being introduced into the image sensor. In one example, the infrared-ray blocking filter may be located between the lens module and the image sensor. The infrared-ray blocking filter may be located on a holder member (not illustrated), which is provided separately from a base 500. Alternatively, the infrared-ray blocking filter may be mounted in a through-hole 510, which is formed in the central portion of the base 500. The infrared-ray blocking filter may be formed of, for example, a film material or glass material. Alternatively, the infrared-ray blocking filter may be formed by coating an optical filter, which has a flat plate shape and is formed of cover glass for the protection of an image-capturing surface, with an infrared-ray blocking material.

The printed circuit board may support the lens driving unit 10. The image sensor may be mounted on the printed circuit board. In one example, the image sensor may be located on the inner side of the upper surface of the printed circuit board, and a sensor holder (not illustrated) may be located on the outer side of the upper surface of the printed circuit board. The lens driving unit 10 may be located above the sensor holder. Alternatively, the lens driving unit 10 may be located on the outer side of the upper surface of the printed circuit board and the image sensor may be located on the inner side of the upper surface of the printed circuit board. Through this structure, light that has passed through the lens module, which is accommodated inside the lens driving unit 10, may be emitted to the image sensor mounted on the printed circuit board. The printed circuit board may supply a voltage to the lens driving unit 10. The controller for controlling the lens driving unit 10 may be located on the printed circuit board.

The image sensor may be mounted on the printed circuit board. The image sensor may be located so as to have the same optical axis as the lens module. Thereby, the image sensor may acquire light that has passed through the lens module. The image sensor may output the acquired light as an image. In one example, the image sensor may be a Charge Coupled Device (CCD), a Metal Oxide Semiconductor (MOS), a Charge Priming Device (CPD), or a Charge Injection Device (CID), without being limited thereto.

The controller may be mounted on the printed circuit board. The controller may be located at the outer side of the lens driving unit 10. Alternatively, the controller may be located at the inner side of the lens driving unit 10. The controller may control, for example, the direction, intensity and pulse width of the current supplied to each constituent element of the lens driving unit 10. The controller may perform the auto-focusing function and/or the hand tremor compensation function of the camera module by controlling the lens driving unit 10. That is, the controller may move the lens module in the optical-axis direction or in a direction perpendicular to the optical-axis direction, or may tilt the lens module by controlling the lens driving unit 10. In addition, the controller may perform the feedback control of the auto-focusing function and/or the hand tremor compensation function. More specifically, the controller may control the voltage or current that is to be applied to a first drive part 220 or a pattern coil 410 based on the position of a bobbin 210 or a housing 310, which is sensed by a sensor part 700.

Hereinafter, the configuration of the lens driving unit 10 according to the present embodiment will be described with reference to the drawings.

Figure 2:
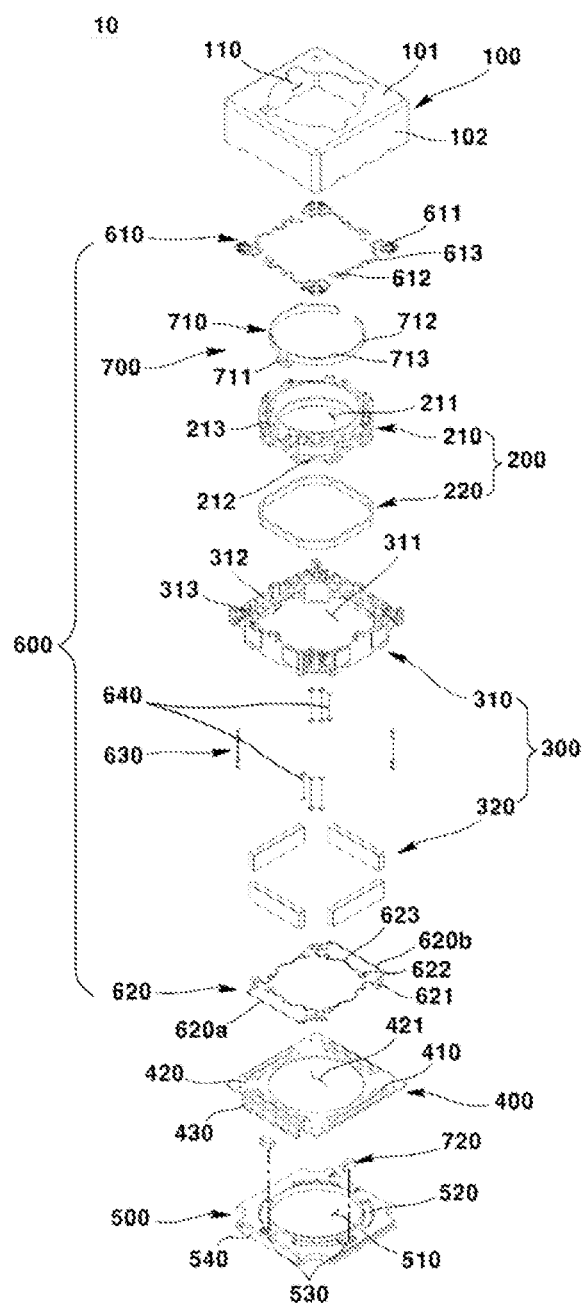
FIG. 2 is an exploded perspective view of the lens driving unit according to the present embodiment.
Figure 3:
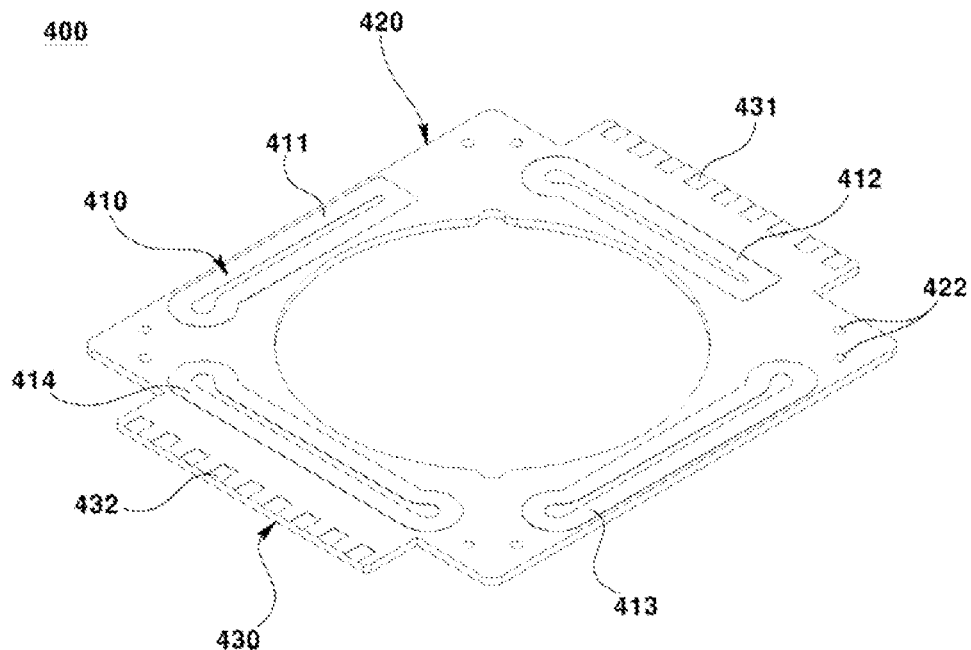
FIG. 3 is a perspective view illustrating a pattern coil part of the lens driving unit according to the present embodiment.
Figure 4:
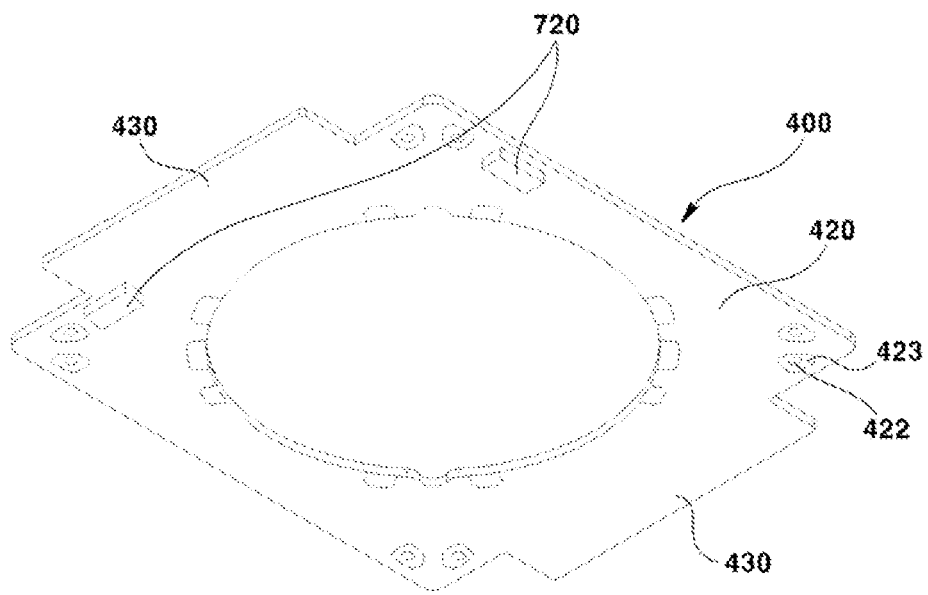
FIG. 4 is a bottom perspective view illustrating the coupling of a second sensor part and the pattern coil part of the lens driving unit according to the present embodiment.
Figure 5:
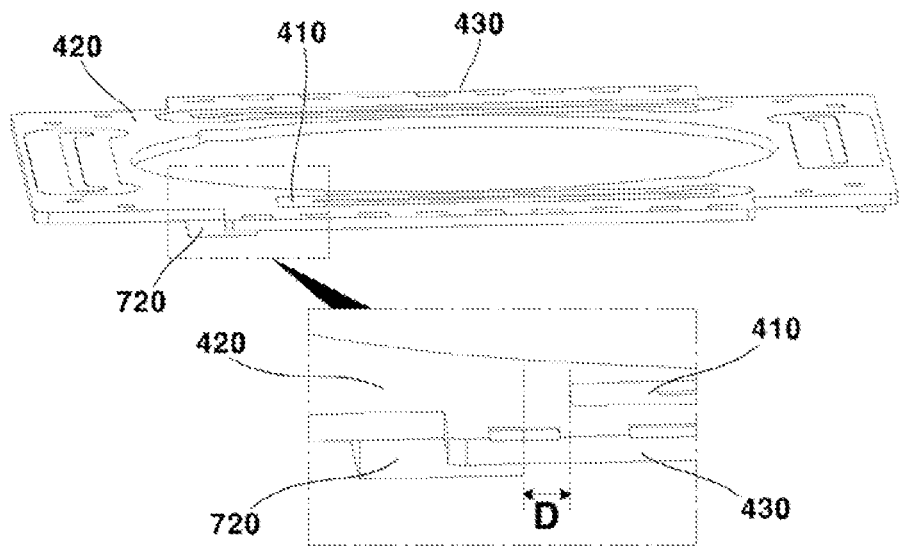
FIG. 5 illustrates a perspective view and a partially enlarged view illustrating the coupling of the second sensor part and the pattern coil part of the lens driving unit according to the present embodiment.
Figure 6:
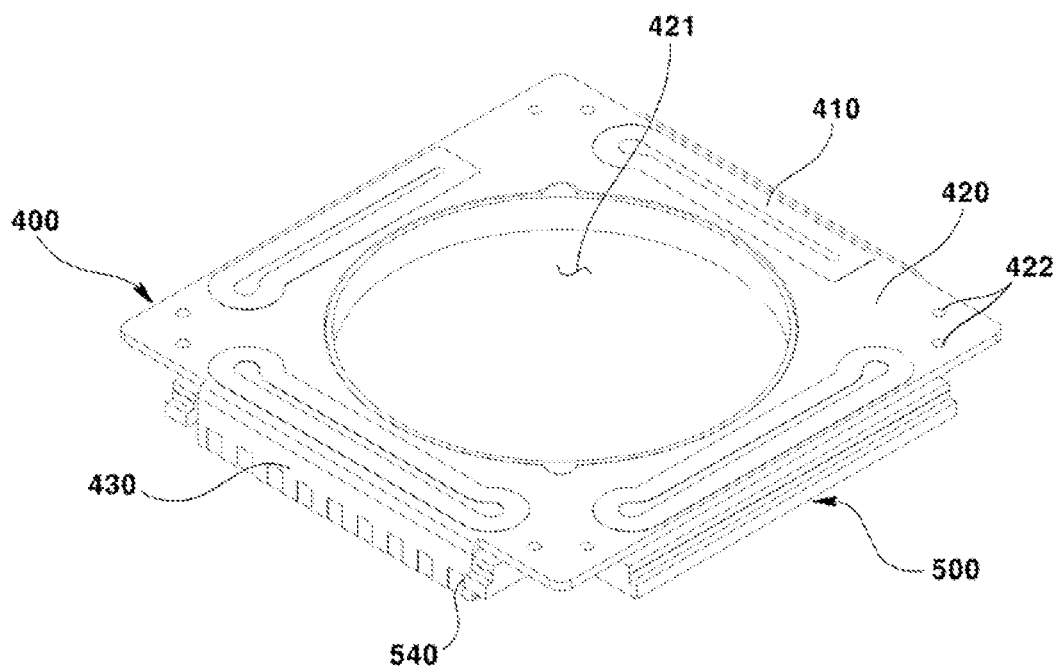
FIG. 6 is a perspective view illustrating the coupling of a base and the pattern coil part of the lens driving unit according to the present embodiment.

FIG. 1 is a perspective view illustrating a lens driving unit according to an embodiment, FIG. 2 is an exploded perspective view of the lens driving unit according to the present embodiment, FIG. 3 is a perspective view illustrating a pattern coil part of the lens driving unit according to the present embodiment, FIG. 4 is a bottom perspective view illustrating the coupling of a second sensor part and the pattern coil part of the lens driving unit according to the present embodiment, FIG. 5 illustrates a perspective view and a partially enlarged view illustrating the coupling of the second sensor part and the pattern coil part of the lens driving unit according to the present embodiment, and FIG. 6 is a perspective view illustrating the coupling of a base and the pattern coil part of the lens driving unit according to the present embodiment.

Referring to FIGS. 1 to 6, the lens driving unit 10 according to the present embodiment may include a cover member 100, a first mover 200, a second mover 300, a pattern coil part 400, a base 500, a support member 600, and a sensor part 700. In the lens driving unit 10 according to the present embodiment, one or more of the cover member 100, the first mover 200, the second mover 300, the pattern coil part 400, the base 500, the support member 600, and the sensor part 700 may be omitted. In particular, the sensor part 700 is used for the auto-focusing feedback function and/or the hand tremor compensation feedback function, and may be omitted.

The cover member 100 may define the external appearance of the lens driving unit 10. The cover member 100 may take the form of a hexahedron, the bottom of which is open, without being limited thereto. The cover member 100 may include an upper plate 101 and a side plate 102 extending downward from the outer periphery of the upper plate 101. The side plate 102 of the cover member 100 may have a lower end mounted on the base 500. The cover member 100 and the base 500 may define the space therein for accommodating the first mover 200, the second mover 300, the pattern coil part 400, and the support member 600. In addition, the cover member 100 may be mounted on the base 500 such that the inner surface thereof comes into close contact with a portion of the side surface or the entire side surface of the base 500. Through this structure, the cover member 100 may function to protect the elements therein from an external shock and to inhibit the introduction of contaminants.

The cover member 100 may be formed of, for example, a metal material. More specifically, the cover member 100 may be formed of a metal panel. In this case, the cover member 100 may inhibit the interference of electric waves. That is, the cover member 100 may inhibit electric waves, generated at the outside of the lens driving unit 10, from being introduced into the cover member 100.

In addition, the cover member 100 may inhibit electric waves, generated inside the cover member 100, from being discharged outward from the cover member 100. Note that the material of the cover member 100 is not limited to the aforementioned one.

The cover member 100 may include an opening 110 formed in the upper plate 101 for exposing the lens module. The opening 110 may have a shape corresponding to the lens module. The size of the opening 110 may be larger than the diameter of the lens module in order to allow the lens module to be assembled through the opening 110. In addition, light introduced through the opening 110 may pass through the lens module. The light that has passed through the lens module may be transferred to the image sensor.

The cover member 100 may include a cutaway portion 120 for exposing a terminal portion 430 to the outside. The cutaway portion 120 may be cut away from a lower portion of the cover member 100. The cutaway portion 120 may expose the terminal portion 430 to the outside and may be spaced apart from the terminal portion 430. An insulation material may be disposed between the cutaway portion 120 and the terminal portion 430 so as to inhibit electrical conduction between the cover member 100 and the terminal portion 430.

The first mover 200 may be coupled to the lens module, which is one constituent element of the camera module (note that the lens module may be described as a constituent element of the lens driving unit 10). The lens module may be located inside the first mover 200. The outer circumferential surface of the lens module may be coupled to the inner circumferential surface of the first mover 200. The first mover 200 may be moved along with the lens module via interaction with the second mover 300. That is, the first mover 200 may move the lens module.

The first mover 200 may include a bobbin 210 and a first drive part 220. The bobbin 210 of the first mover 200 may be coupled to the lens module. The first drive part 220 of the first mover 200 may be located on the bobbin 210 and may be moved by electromagnetic interaction with a second drive part 320.

The bobbin 210 may be coupled to the lens module. More specifically, the outer circumferential surface of the lens module may be coupled to the inner circumferential surface of the bobbin 210. The first drive part 220 may be coupled to the bobbin 210. In addition, the bottom of the bobbin 210 may be coupled to a lower support member 620 and the top of the bobbin 210 may be coupled to an upper support member 610. The bobbin 210 may be located inside the housing 310. The bobbin 210 may move in the optical-axis direction relative to the housing 310.

The bobbin 210 may include a lens coupling portion 211 formed therein. The lens module may be coupled to the lens coupling portion 211. The inner circumferential surface of the lens coupling portion 211 may be provided with screw-threads, which correspond to screw-threads formed on the outer circumferential surface of the lens module. That is, the outer circumferential surface of the lens module may be screwed to the inner circumferential surface of the lens coupling portion 211. Alternatively, an adhesive may be introduced between the lens module and the bobbin 210. At this time, the adhesive may be Ultraviolet-Light (UV) curable epoxy. That is, the lens module and the bobbin 210 may be attached to each other by UV curable epoxy. Alternatively, the lens module and the bobbin 210 may be attached to each other by thermally curable epoxy.

The bobbin 210 may include a first-drive-part coupling portion 212 on which the first drive part 220 is wound or mounted. The first-drive-part coupling portion 212 may be integrally formed with the outer surface of the bobbin 210. In addition, the first-drive-part coupling portion 212 may be formed throughout the outer surface of the bobbin 210, or may be formed at predetermined intervals on the outer surface of the bobbin 210. The first-drive-part coupling portion 212 may include a recess formed in a portion of the outer surface of the bobbin 210. The first drive part 220 may be located in the recess. At this time, the first drive part 220 may be supported by the first-drive-part coupling portion 212.

In one example, the first-drive-part coupling portion 212 may be formed by protruding portions on the upper and lower sides of the recess. At this time, a coil of the first drive part 220 may be wound in the recessed first-drive-part coupling portion 212. In another example, the first-drive-part coupling portion 212 may take the form of a recess, the upper or lower side of which is open and the other side of which is provided with a holder portion, such that the coil of the first drive part 220, which has been previously wound, may be inserted and coupled through the open side.

The bobbin 210 may include an upper coupling portion 213 configured to be coupled to the upper support member 610. The upper coupling portion 213 may be coupled to an inner-side portion 612 of the upper support member 610. In one example, a protrusion (not illustrated) of the upper coupling portion 213 may be inserted into and coupled to a recess or hole (not illustrated) formed in the inner-side portion 612. Alternatively, the upper support member 610 may be provided with a protrusion and the bobbin 210 may be provided with a recess or hole for the coupling therebetween. The bobbin 210 may include a lower coupling portion (not illustrated) configured to be coupled to the lower support member 620. The lower coupling portion formed on the bottom of the bobbin 210 may be coupled to an inner-side portion 622 of the lower support member 620. In one example, a protrusion (not illustrated) of the lower coupling portion may be inserted into and coupled to a recess or hole (not illustrated) formed in the inner-side portion 622. Alternatively, the lower support member 620 may be provided with a protrusion and the bobbin 210 may be provided with a recess or hole for the coupling therebetween.

The first drive part 220 may be located so as to be opposite the second drive part 320 of the second mover 300. The first drive part 220 may move the bobbin 210 relative to the housing 310 via electromagnetic interaction with the second drive part 320. The first drive part 220 may include a coil. The coil may be guided by the first-drive-part coupling portion 212 so as to be wound around the outer surface of the bobbin 210. In another embodiment, four coils may be independently provided on the outer surface of the bobbin 210 such that two neighboring coils form an angle of 90 degrees therebetween. When the first drive part 220 includes the coil, a voltage may be supplied to the coil through the lower support member 620. At this time, the lower support member 620 may be divided into a pair of lower support members for the supply of voltage to the coil. The first drive part 220 may include a pair of lead cables (not illustrated) for the supply of voltage. In this case, each of the pair of lead cables of the first drive part 220 may be electrically coupled to each of the pair of lower support members 620. Alternatively, the first drive part 220 may receive a voltage from the upper support member 610. When a voltage is supplied to the coil, an electromagnetic field may be formed around the coil. In another embodiment, the first drive part 220 may include a magnet and the second drive part 320 may include a coil.

The second mover 300 may be located at the outer side of the first mover 200 so as to be opposite the first mover 200. The second mover 300 may be supported by the base 500 located therebelow. The second mover 300 may be supported by fixing members. At this time, the fixing members may include the base 500 and the pattern coil part 400. That is, the second mover 300 may be supported by the base 500 and/or the pattern coil part 400. The second mover 300 may be located in the space inside the cover member 100.

The second mover 300 may include the housing 310 and the second drive part 320. The housing 310 of the second mover 300 may be located at the outer side of the bobbin 210. In addition, the second drive part 320 of the second mover 300 may be located so as to be opposite the first drive part 220 and may be fixed to the housing 310.

At least a portion of the housing 310 may have a shape corresponding to the inner surface of the cover member 100. In particular, the outer surface of the housing 310 may have a shape corresponding to the inner surface of the side plate 102 of the cover member 100. The outer surface of the housing 310 and the inner surface of the side plate 102 of the cover member 100 may be flat. More specifically, when the housing 310 is located at the initial position thereof, the outer surface of the housing 310 and the inner surface of the side plate 102 of the cover member 100 may be parallel to each other. In this case, when the housing 310 is moved closest to the cover member 100, the outer surface of the housing 310 and the inner surface of the side plate 102 of the cover member 100 may come into surface contact with each other, which may disperse a shock generated in the housing 310 and/or the cover member 100. The housing 310 may take the form of, for example, a hexahedron having four sides. Note that the housing 310 may have any other shape so long as it can be located inside the cover member 100.

The housing 310 may be formed of an insulation material and may be injection-molded in consideration of productivity. Because the housing 310 is moved for Optical Image Stabilization (OIS) driving, the housing 310 may be spaced apart from the cover member 100 by a predetermined distance. However, in an Auto-Focusing (AF) model, the housing 310 may be fixed on the base 500. Alternatively, in the AF model, the housing 310 may be omitted and a magnet, which is provided as the second drive part 320, may be fixed to the cover member 100.

The housing 310 may have open upper and lower sides and may accommodate the first mover 200 in a vertically movable manner. The housing 310 may include an inner space 311, the upper and lower sides of which are open. The bobbin 210 may be movably located in the inner space 311. That is, the inner space 311 may have a shape corresponding to the bobbin 210. In addition, the inner circumferential surface of the housing 310, which defines the inner space 311, may be spaced apart from the outer circumferential surface of the bobbin 210. The housing 310 may be supported so as to be movable relative to the base 500. That is, the housing 310 may be horizontally moved or tilted relative to the base 500.

The housing 310 may include a second-drive-part coupling portion 312 formed on the side surface thereof so as to have a shape corresponding to the second drive part 320 for accommodating the second drive part 320. That is, the second-drive-part coupling portion 312 may accommodate and fix the second drive part 320. The second drive part 320 may be fixed to the second-drive-part coupling portion 312 using an adhesive (not illustrated). The second-drive-part coupling portion 312 may be located on the inner circumferential surface of the housing 310. This may be advantageous for the electromagnetic interaction between the second drive part 320 and the first drive part 220 located therein. The second-drive-part coupling portion 312 may have, for example, the open bottom side. This may be advantageous for the electromagnetic interaction between the second drive part 320 and a body 420 located below the second drive part 320. In one example, the lower end of the second drive part 320 may protrude downward from the lower end of the housing 310. For example, four second-drive-part coupling portions 312 may be provided. The second drive part 320 may be coupled to each of the four second-drive-part coupling portions 312.

The housing 310 may be coupled at the top thereof to the upper support member 610 and may be coupled at the bottom thereof to the lower support member 620. The housing 310 may include an upper coupling portion 313 configured to be coupled to the upper support member 610. The upper coupling portion 313 may be coupled to an outer-side portion 611 of the upper support member 610. In one example, a protrusion of the upper coupling portion 313 may be inserted into and coupled to a recess or hole (not illustrated) in the outer-side portion 611. In an alternative embodiment, the upper support member 610 may be provided with a protrusion and the housing 310 may be provided with a recess or hole for the coupling therebetween. The housing 310 may further include a lower coupling portion (not illustrated) configured to be coupled to the lower support member 620. The lower coupling portion formed on the bottom of the housing 310 may be coupled to an outer-side portion 621 of the lower support member 620. In one example, the protrusion of the lower coupling portion may be inserted into and coupled to a recess or hole (not illustrated) in the outer-side portion 621. In an alternative embodiment, the lower support member 620 may be provided with a protrusion and the housing 310 may be provided with a recess or hole for the coupling therebetween.

The housing 310 may include a first side surface, a second side surface located near the first side surface, and a corner portion located between the first side surface and the second side surface. The corner portion of the housing 310 may be provided with an upper stopper (not illustrated). The upper stopper may vertically overlap the cover member 100. When the housing 310 is moved upward by an external shock, the upper stopper may limit the upward movement of the housing 310 by coming into contact with the cover member 100.

The second drive part 320 may be located so as to be opposite the first drive part 220 of the first mover 200. The second drive part 320 may move the first drive part 220 via electromagnetic interaction with the first drive part 220. The second drive part 320 may include a magnet. The magnet may be fixed to the second-drive-part coupling portion 312 of the housing 310. In one example, as illustrated in FIG. 2, four magnets may be independently provided on the housing 310 such that the two neighboring magnets form an angle of 90 degrees therebetween. That is, four second drive parts 320 may be equidistantly mounted on four side surfaces of the housing 310, which may contribute to the efficient use of the inner volume. In addition, the second drive parts 320 may be attached to the housing 310 using an adhesive, without being limited thereto. Alternatively, the first drive part 200 may include a magnet and the second drive part 320 may include a coil.

The pattern coil part 400 may be located on the base 500. The pattern coil part 400 may be located so as to be opposite the bottom of the second mover 300. The pattern coil part 400 may movably support the second mover 300. The pattern coil part 400 may move the second mover 300. The pattern coil part 400 may be centrally provided with a through-hole 421, which corresponds to the lens module. In the present embodiment, because the pattern coil part 400 may be provided with the terminal portion 430 to enable direct electrical conduction with the outside, a separate Flexible Printed Circuit Board (FPCB) may not be provided. Accordingly, the present embodiment may achieve a reduction in price attributable to a reduction in the number of elements, processes, and process management points, compared to a model in which an FPCB and a pattern coil are separately provided. In addition, the overall height of the product is reduced, which may contribute to a reduction in size.

The pattern coil part 400 may include a lower first layer and a second layer stacked on the first layer, a second sensor part 720 being mounted underneath the first layer, and the pattern coil 410 being formed on the second layer. At this time, each of the first layer and the second layer may include a single conductive layer. In one example, when the pattern coil part 400 includes only two layers, i.e. the first layer and the second layer, the second sensor part 720 and the pattern coil 410 may not vertically overlap each other. The pattern coil part 400 may further include a third layer interposed between the first layer and the second layer. That is, the pattern coil part 400 may include three or more layers. In other words, the pattern coil part 400 may include three or more conductive layers. In this case, the second sensor part 720 and the pattern coil 410 may vertically overlap each other.

The pattern coil part 400 may include, for example, the pattern coil 410 and the body 420. The pattern coil part 400 may include the pattern coil 410 disposed on the body 420. In addition, the body 420 of the pattern coil part 400 may be located so as to be opposite the bottom of the second drive part 320 and may be seated on the base 500. The pattern coil part 400 may include the pattern coil 410, the body 420 provided with the pattern coil 410, and the terminal portion 430 bent from the body 420 so as to extend downward.

The pattern coil 410 may be opposite the second drive part 320. The pattern coil 410 may move the second drive part 320 via electromagnetic interaction therebetween. When a voltage is applied to the pattern coil 410, the second drive part 320 and the housing 310, to which the second drive part 320 is fixed, may be integrally moved via interaction between the pattern coil 410 and the second drive part 320. The pattern coil 410 may be mounted on or electrically connected to the body 420, or may be integrally formed with the body 420. The pattern coil 420 may be, for example, a Fine Pattern (FP) coil and may be placed, mounted or formed on the body 420. The pattern coil 410 may be formed, for example, so as to minimize interference with the second sensor part 720 located therebelow. The pattern coil 410 may be formed so as not to vertically overlap the second sensor part 720. The second sensor part 720 may be mounted below the pattern coil part 400 so as not to vertically overlap the pattern coil 410. In addition, the pattern coil 410 may have an asymmetrical shape.

The pattern coil 410 may include first to fourth coil pieces 411, 412, 413 and 414 arranged around the through-hole 421. The first coil piece 411 and the third coil piece 413 may be opposite each other, and the second coil piece 412 and the fourth coil piece 414 may be opposite each other. The first coil piece 411 may be near the second coil piece 412 and the fourth coil piece 414, and the third coil piece 413 may be near the fourth coil piece 414 and the second coil piece 412. That is, the first coil piece 411 to the fourth coil piece 414 may be successively arranged in the clockwise or counter-clockwise direction. The first coil piece 411 and the second coil piece 412 may have a corresponding shape, and the third coil piece 413 and the fourth coil piece 414 may have a corresponding shape. Note that the shapes of the first coil piece 411 and the third coil piece 413 may not correspond to each other. Through the change in the shape of the first coil piece 411 to the fourth coil piece 414, the space for the mounting of the second sensor part 720 may be attained. The second sensor part 720 may be located so as not to vertically overlap the first coil piece 411 to the fourth coil piece 414. Two second sensor parts 720 may be provided. At this time, imaginary lines that connect the two second sensor parts 720 to the optical axis, may be perpendicular to each other. When the second sensor parts 720 do not vertically overlap the first coil piece 411 to the fourth coil piece 414, the body 420 may include only two layers (conductive layers), which is advantageous.

In another embodiment, the first coil piece 411 to the fourth coil piece 414 may vertically overlap the second sensor parts 720. In this case, the body 420 may include three or more layers (conductive layers). This is because the body 420 that includes only two layers, as in the above example, may cause failure in electrical conduction between the second sensor parts 720 and the pattern coil 410, which overlap each other in the optical-axis direction.

The body 420 may be seated on the base 500. The body 420 may supply a voltage to the pattern coil 410. In addition, the body 420 may supply a voltage to the first drive part 220 or the second drive part 320. In one example, the body 420 may supply a voltage to the first drive part 220 through a lateral support member 630, the upper support member 610, an electrical conduction member 640, and the lower support member 620. Alternatively, the body 420 may supply a voltage to the first drive part 220 through the lateral support member 630 and the upper support member 610.

The body 420 may support the housing 310 from the bottom side thereof so that the housing 310 is horizontally moved or tilted. The body 420 may be coupled to the housing 310 via the lateral support member 630. The second sensor part 720, which senses the position or movement of the housing 310, may be located on the body 420. The pattern coil 410 may be located on the upper surface of the body 420, and the second sensor part 720 may be located on the lower surface of the body 420.

The body 420 may include the through-hole 421. Light that has passed through the lens module may pass through the through-hole 421 of the body 420. The through-hole 421 may be formed in the central portion of the body 420. The through-hole 421 may have a circular shape, without being limited thereto.

The body 420 may include a coupling hole 422 for the penetration of a wire of the lateral support member 630, and an electrical conduction portion 423 formed on the lower surface of the body 420 so as to come into contact with the coupling hole 422. The coupling hole 422 may be formed in the body 420, and the lateral support member 630 may pass through the coupling hole 422. The electrical conduction portion 423, which is formed on the lower surface of the body 420 so as to come into contact with the coupling hole 422, may be electrically connected to the lateral support member 630, which is coupled to the coupling hole 422.

The terminal portion 430 may be connected to an external power supply through conductive layers 431 and 432. A voltage may be supplied to the body 420 through the terminal portion 430. The terminal portion 430 may extend from the lateral side of the body 420. A pair of terminal portions 430 may be located on opposite lateral sides of the body 420. The body 420 and the terminal portions 430 may be integrally formed with each other. The terminal portions 430 may have a width smaller than the body 420. Each of the terminal portions 430 may be accommodated in a terminal accommodation portion 540, which is formed in a portion of the side surface of the base 500. The terminal accommodation portion 540 may have a width corresponding to the width of the terminal portion 430.

The base 500 may support the second mover 300. The printed circuit board may be located below the base 500. The base 500 may include the through-hole 510, which is formed at a position corresponding to the lens coupling portion 211 of the bobbin 210. The base 500 may function as a sensor holder for protecting the image sensor. An infrared-ray filter may be coupled to the through-hole 510 of the base 500. Alternatively, the infrared-ray filter may be coupled to a separate sensor holder, which is located below the base 500.

The base 500 may include, for example, a foreign substance collection portion 520, which collects a foreign substance introduced into the cover member 100. The foreign substance collection portion 520 may be located on the upper surface of the base 500, and may include an adhesive material so as to collect a foreign substance in the inner space defined by the cover member 100 and the base 500.

The base 500 may include a sensor part accommodation recess 530 to which the second sensor part 720 is coupled. That is, the second sensor part 720 may be mounted in the sensor part accommodation recess 530. At this time, the second sensor part 720 may sense the horizontal movement or tilting of the housing 310 by sensing the second drive part 320 coupled to the housing 310. For example, two sensor part accommodation recesses 530 may be provided. The two sensor part accommodation recesses 530 may accommodate the respective second sensor parts 720. In this case, the second sensor parts 720 may be arranged so as to sense all of the x-axis movement and the y-axis movement of the housing 310. That is, imaginary lines that connect the two second sensor parts 720 to the optical axis, may be perpendicular to each other.

The support member 600 may connect two or more ones of the first mover 200, the second mover 300, the pattern coil part 400, and the base 500 to each other. The support member 600 may elastically connect two or more of the first mover 200, the second mover 300, the pattern coil part 400, and the base 500 to each other so as to enable relative movement between the respective constituent elements. The support member 600 may be an elastic member. The support member 600 may include, for example, the upper support member 610, the lower support member 620, the lateral support member 630, and the electrical conduction member 640. The electrical conduction member 640 may be used for the electrical conduction between the upper support member 610 and the lower support member 620, and may be described separately from the upper support member 610, the lower support member 620, and the lateral support member 630.

The upper support member 610 may include, for example, the outer-side portion 611, the inner-side portion 612, and a connection portion 613. The upper support member 610 may include the outer-side portion 611 coupled to the housing 310, the inner-side portion 612 coupled to the bobbin 210, and the connection portion 613 for elastically connecting the outer-side portion 611 and the inner-side portion 612 to each other.

The upper support member 610 may be connected to the top of the first mover 200 and the top of the second mover 300. More specifically, the upper support member 610 may be coupled to the top of the bobbin 210 and the top of the housing 310. The inner-side portion 612 of the upper support member 610 may be coupled to the upper coupling portion 213 of the bobbin 210, and the outer-side portion 611 of the upper support member 610 may be coupled to the upper coupling portion 313 of the housing 310.

The upper support member 610 may be divided into, for example, six upper electrical conduction parts. At this time, two upper electrical conduction parts among the six upper electrical conduction parts may be used to apply a voltage to the first drive part 220 via the electrical conduction with the lower support member 620. Each of the two upper electrical conduction parts may be electrically connected to each of a pair of lower support members 620a and 620b via the electrical conduction member 640. The other four upper electrical conduction parts among the six upper electrical conduction parts may conduct electricity together with the first sensor part 710, which is located on the bobbin 210. The other four upper electrical conduction parts may be used to supply a voltage to the first sensor part 710 and to enable the transmission and reception of information or signals between the controller and the first sensor part 710. In an alternative embodiment, two upper electrical conduction parts among the six upper electrical conduction parts may be directly connected to the first drive part 220, and the other four upper electrical conduction parts may be connected to the first sensor part 710.

The lower support member 620 may include, for example, the pair of lower support members 620a and 620b. That is, the lower support member 620 may include a first lower support member 620a and a second lower support member 620b. At this time, the lower support member 620 may be described as including two lower electrical conduction parts. Each of the first lower support member 620a and the second lower support member 620b may be connected to each of the lead cables of the first drive part 220, which is configured as a coil, thereby supplying a voltage thereto. The lower support members 620a and 620b may be electrically connected to the pattern coil 410. Through this structure, the lower support members 620 may provide a voltage supplied from the pattern coil 410 to the first drive part 220.

The lower support member 620 may include, for example, the outer-side portion 621, the inner-side portion 622, and a connection portion 623. The lower support member 620 may include the outer-side portion 621 coupled to the housing 310, the inner-side portion 622 coupled to the bobbin 210, and the connection portion 623 for elastically connecting the outer-side portion 621 and the inner-side portion 622 to each other.

The lower support member 620 may be connected to the bottom of the first mover 200 and the bottom of the second mover 300. More specifically, the lower support member 620 may be coupled to the bottom of the bobbin 210 and the bottom of the housing 310. The inner-side portion 622 of the lower support member 620 may be coupled to the lower coupling portion of the bobbin 210, and the outer-side portion 621 of the lower support member 620 may be coupled to the lower coupling portion of the housing 310.

The lateral support member 630 may be coupled at one side thereof to the pattern coil part 400 and/or the base 500 and coupled at the other side thereof to the upper support member 610 and/or the second mover 300. In one example, the lateral support member 630 may be coupled at one side thereof to the pattern coil part 400 and coupled at the other side thereof to the housing 310. In another example, the lateral support member 630 may be coupled at one side thereof to the base 500 and coupled at the other side thereof to the upper support member 610. As such, the lateral support member 630 may elastically support the second mover 300 so that the second mover 300 is horizontally moved or tilted relative to the base 500.

The lateral support member 630 may include a plurality of wires. In addition, the lateral support member 630 may include a plurality of leaf-springs. In one example, the lateral support member 630 may be provided in the same number as the upper support member 610. That is, the lateral support member 630 may be divided into six lateral support parts so as to be connected the respective parts of the upper support member 610. In this case, each part of the lateral support member 630 may supply a voltage, supplied from the pattern coil part 400 or an external power supply, to each part of the upper support member 610. The number of lateral support members 630 may be determined based on, for example, symmetry. In one example, the lateral support member 630 may include a total of eight parts such that two parts are arranged on each corner of the housing 310.

The lateral support member 630 or the upper support member 610 may include, for example, a shock-absorbing part for absorbing an external shock. The shock-absorbing part may be provided on the lateral support member 630 and/or the upper support member 610. The shock-absorbing part may be a separate member, such as a damper. In addition, the shock-absorbing part may be realized by changing the shape of a portion of at least one of the lateral support member 630 and the upper support member 610.

The electrical conduction member 640 may electrically connect the upper support member 610 and the lower support member 620 to each other. The electrical conduction member 640 may be separately provided from the lateral support member 630. A voltage supplied to the upper support member 610 may be supplied to the lower support member 620 through the electrical conduction member 640, and in turn may be supplied to the first drive part 220 through the lower support member 620. In an alternative embodiment, when the upper support member 610 is directly connected to the first drive part 220, the electrical conduction member 640 may be omitted.

The sensor part 700 may be used for at least one of Auto-Focusing (AF) feedback and hand tremor compensation feedback. The sensor part 700 may sense the position or movement of at least one of the first mover 200 and the second mover 300.

The sensor part 700 may include, for example, the first sensor part 710 and the second sensor part 720. The first sensor part 710 may provide information for AF feedback by sensing the vertical movement of the bobbin 210 relative to the housing 310. In this case, the first sensor part 710 may be referred to as an auto-focusing feedback sensor. The second sensor part 720 may provide information for OIS feedback by sensing the horizontal movement or tilting of the second mover 300. In this case, the second sensor part 720 may be referred to as a hand tremor compensation feedback sensor.

The first sensor part 710 may be located on the first mover 200. The first sensor part 710 may be located on the bobbin 210. The first sensor part 710 may be inserted into and fixed to a sensor guide groove (not illustrated) formed in the outer circumferential surface of the bobbin 210. The first sensor part 710 may include, for example, a first sensor 711, a flexible printed circuit board 712, and a terminal portion 713.

The first sensor 711 may sense the movement or position of the bobbin 210. Alternatively, the first sensor 711 may sense the position of the second drive part 320 mounted on the housing 310. The first sensor 711 may be, for example, a hall sensor. In this case, the first sensor 711 may sense variation in the relative positions between the bobbin 210 and the housing 310 by sensing magnetic force generated from the second drive part 320.

The first sensor 711 may be mounted on the flexible printed circuit board 712. The flexible printed circuit board 712 may have, for example, a strip shape. At least a portion of the flexible printed circuit board 712 may have a shape corresponding to a sensor guide groove, which is formed in the top of the bobbin 210, so as to be inserted into the sensor guide groove. The flexible printed circuit board 712 may bend so as to correspond to the shape of the sensor guide groove. The terminal portion 713 may be formed on the flexible printed circuit board 712.

The terminal portion 713 may receive a voltage and supply the same to the first sensor 711 through the flexible printed circuit board 712. In addition, the terminal portion 713 may receive a control command for the first sensor 711, or may transmit a sensed value from the first sensor 711. In one example, four terminal portions 713 may be provided and may be electrically connected to the upper support member 610. In this case, two terminal portions 713 may be used to receive a voltage from the upper support member 610, and the other two terminal portions 713 may be used to transmit or receive information or signals.

The second sensor part 720 may be located on the pattern coil part 400. The second sensor part 720 may be located on the upper surface or the lower surface of the pattern coil 410. In one example, the second sensor part 720 may be disposed on the lower surface of the pattern coil 410 so as to be located in the sensor part accommodation recess 530 formed in the base 500. The second sensor part 720 may include, for example, a hall sensor. In this case, the second sensor part 720 may sense the movement of the second mover 300 relative to the pattern coil part 400 by sensing the magnetic field of the second drive part 320. The hall sensor may be mounted on the body 420 via Surface Mount Technology (SMT). In one example, at least two second sensor parts 720 may be provided to sense all of the x-axis movement and the y-axis movement of the second mover 300.

In one example, the second sensor part 720 may be located so as not to overlap the pattern coil 410 in the optical-axis direction. The second sensor part 720 and the pattern coil 410, as illustrated in FIG. 5, may be horizontally spaced apart from each other by a distance D. At this time, the body 420 may be formed in two layers.

In an alternative embodiment, the second sensor part 720 may be located so as to overlap the pattern coil 410 in the optical-axis direction. In this case, the body 420 may be formed in three or more layers in order to avoid the electrical conduction between the pattern coil 410 and the second sensor part 720.

Hereinafter, the operation of the camera module according to the present embodiment will be described.

First, the auto-focusing function of the camera module according to the present embodiment will be described. When a voltage is supplied to the coil of the first drive unit 220, the first drive part 220 begins to move relative to the second drive part 320 via the electromagnetic interaction between the first drive part 220 and the magnet of the second drive part 320. At this time, the bobbin 210, coupled to the first drive part 220, is integrally moved along with the first drive part 220. That is, the bobbin 210, coupled inside the lens module, is vertically moved relative to the housing 310. This movement of the bobbin 210 causes the lens module to be moved closer to or farther away from the image sensor. Thereby, in the present embodiment, focusing on a subject may be adjusted by supplying a voltage to the coil of the first drive part 220.

Auto-focusing feedback may be applied in order to more precisely realize the auto-focusing function of the camera module according to the present embodiment. The first sensor 711, which is mounted on the bobbin 210 and is provided as a hall sensor, senses the magnetic field of the magnet of the second drive part 320 fixed to the housing 310. When the bobbin 210 is moved relative to the housing 310, the magnitude of the magnetic field sensed by the first sensor 711 varies. As such, the first sensor 711 may sense the moved distance or position of the bobbin 210 in the z-axis direction and may transmit the sensed value to the controller. The controller determines whether or not to additionally move the bobbin 210 based on the received sensed value. Because this process is performed in real time, the camera module according to the present embodiment may more precisely perform the auto-focusing function via auto-focusing feedback.

The hand tremor compensation function of the camera module according to the present embodiment will be described. When a voltage is supplied to the pattern coil 410 of the pattern coil part 400, the second drive part 320 begins to move relative to the pattern coil part 400 via the electromagnetic interaction between the pattern coil 410 and the magnet of the second drive part 320. At this time, the housing 310 coupled to the second drive part 320 is integrally moved along with the second drive part 320. That is, the housing 310 is horizontally moved relative to the base 500. At this time, the housing 310 may be tilted relative to the base 500. This movement of the housing 310 causes the lens module to be moved relative to the image sensor in a direction parallel to the direction in which the image sensor is placed. Thereby, in the present embodiment, the hand tremor compensation function may be performed by supplying a voltage to the pattern coil 410.

Hand tremor compensation feedback may be applied in order to more precisely realize the hand tremor compensation function of the camera module according to the present embodiment. The pair of second sensor parts 720, which are mounted on the pattern coil part 400 and are configured as hall sensors, senses the magnetic field of the magnet of the second drive part 320 fixed to the housing 310. When the housing 310 is moved relative to the base 500, the magnitude of the magnetic field sensed by the second sensor parts 720 varies. The second sensor parts 720 may sense the moved distance or position of the housing 310 in the horizontal direction (i.e. the x-axis direction and the y-axis direction) and may transmit the sensed value to the controller. The controller determines whether or not to additionally move the housing 310 based on the received sensed value. Because this process is performed in real time, the camera module according to the present embodiment may more precisely perform the hand tremor compensation function via hand tremor compensation feedback.

Figure 7:
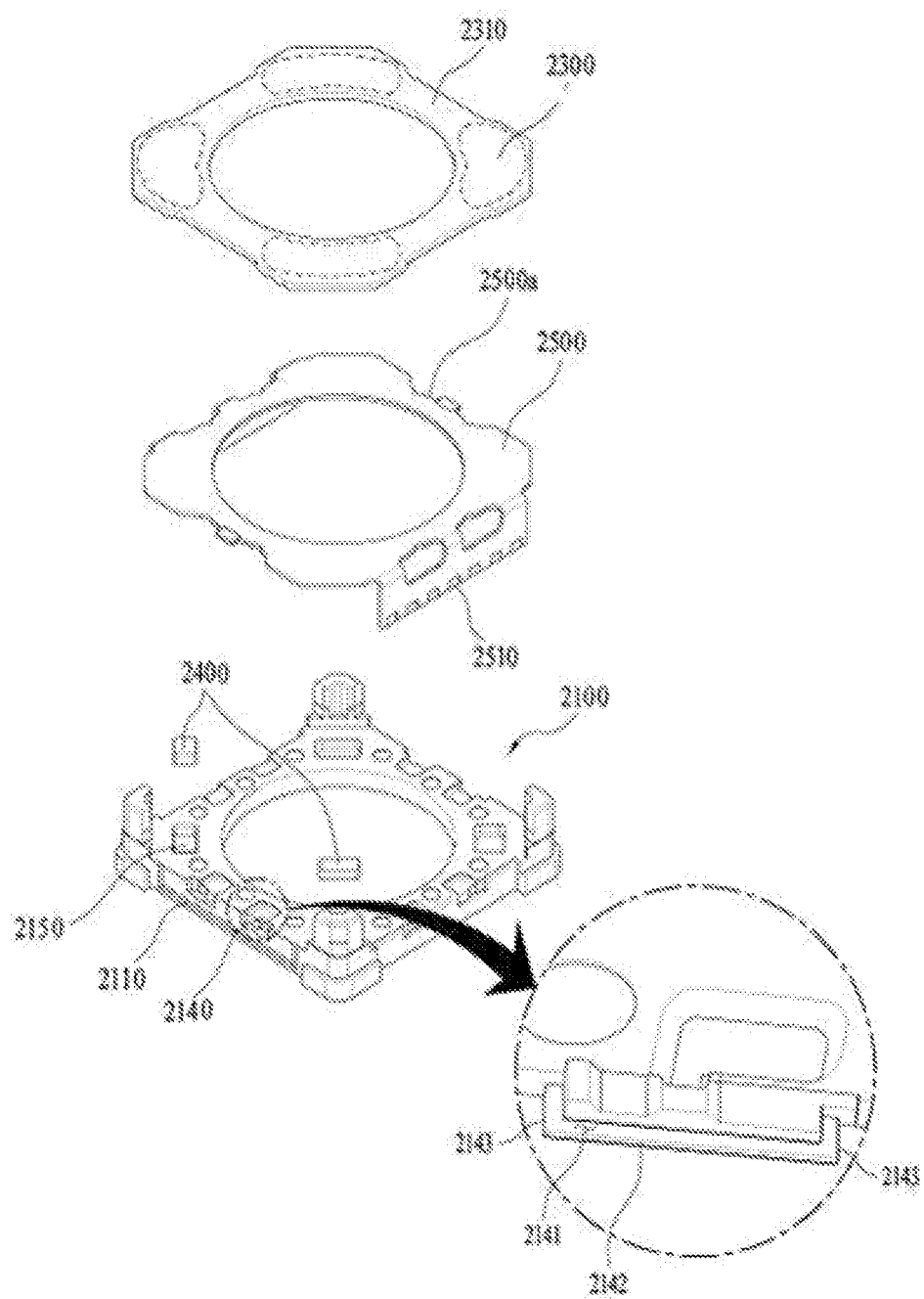
FIG. 7 illustrates a base, a printed circuit board, and a second coil according to an embodiment.

FIG. 7 is an exploded perspective view of a base 2100, a printed circuit board 2500, and a second coil 2300 according to an embodiment. The lens driving unit may further include a position sensor 2400.

The position sensor 2400 may be placed on the center of the second coil 2300 and may sense the movement of a housing 1400. At this time, the position sensor 2400 may basically sense the movement of the housing 1400 in a first direction, and in some cases, may sense the movement of the housing 1400 in the second and third directions.

The position sensor 2400 may be, for example, a hall sensor, or may be any of various other sensors so long as it can sense variation in magnetic force. As illustrated in FIG. 7, two position sensors 2400 may be installed on corner portions of the base 2100, which is located below the printed circuit board 2500, and more specifically, may be inserted into position sensor seating recesses 2150 formed in the base 2100. The printed circuit board 2500 may include an upper surface, on which the second coil 2300 is placed, and a lower surface opposite to the upper surface.

Each position sensor 2400 may be downwardly spaced apart from the second coil 2300 by a predetermined distance with the printed circuit board 2500 interposed therebetween. That is, the position sensor 2400 may not be directly connected to the second coil 2300, and the second coil 2300 may be installed on the upper surface of the printed circuit board 2500 and the position sensor 2400 may be installed on the lower surface of the printed circuit board 2500.

The lens driving apparatus according to the above-described embodiment may be used in various fields, such as, for example, in a camera module. The camera module may be applied to, for example, a mobile appliance, such as a cellular phone.

The camera module according to an embodiment may include a lens barrel coupled to a bobbin, and an image sensor (not illustrated). At this time, the lens barrel may include at least one lens sheet for transferring an image to the image sensor.

In addition, the camera module may further include an infrared-ray blocking filter (not illustrated). The infrared-ray blocking filter serves to inhibit infrared-rays from being introduced into the image sensor.

Figure 9:
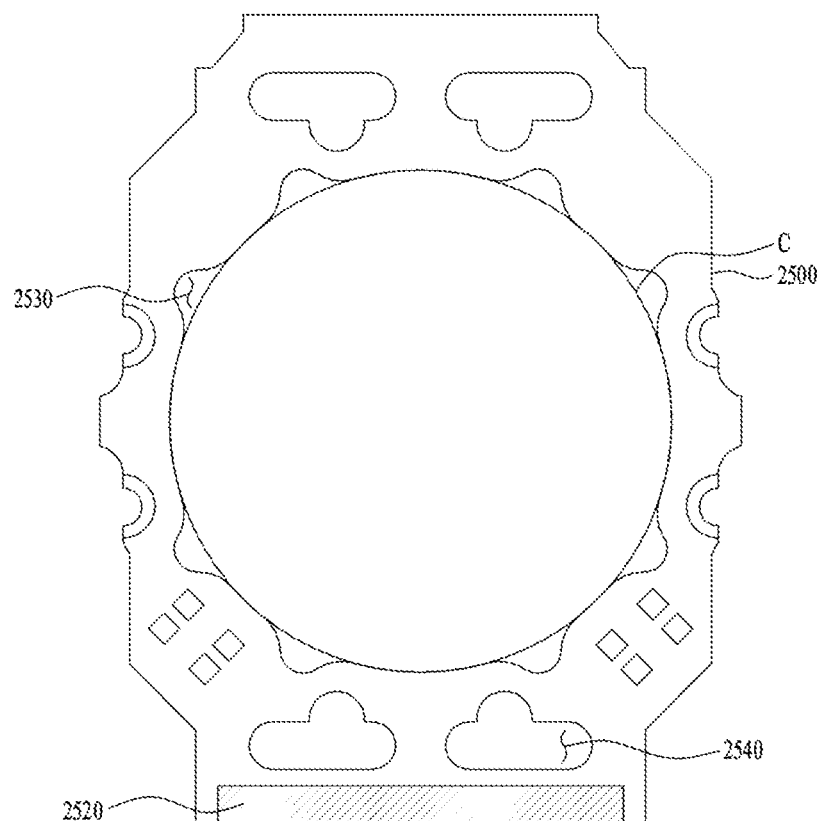
FIG. 9 illustrates the lower surface of the printed circuit board according to the embodiment.

In this case, the infrared-ray blocking filter may be installed on the base 2100 illustrated in FIG. 9 at a position corresponding to the image sensor, and may be coupled to a holder member (not illustrated). In addition, the holder member may support the bottom of the base 2100.

A separate terminal member may be installed on the base 2100 for the electrical conduction with the printed circuit board 2500. Alternatively, a terminal may be integrally formed with the base 2100 using, for example, a surface electrode.

The base 2100 may further include an adhesive member 2110 for attaching the printed circuit board 2500 to the base 2100.

The adhesive member 2110 may be provided on one side surface of the base 2100, and as illustrated, may be provided at the position at which one side surface of the base 2100 comes into surface contact with one side surface of the printed circuit board 2500.

Although the adhesive member 2110 is illustrated as being provided on one side surface of the base 2100 in the present embodiment, the adhesive member 2110 may be additionally provided on each of two opposite side surfaces of the base 2100.

The adhesive members 2110 illustrated in the present embodiment are merely given by way of example, and the scope of the embodiments is not limited by the position and number of adhesive members 2110 so long as the adhesive members 2110 can attach the printed circuit board 2500 to the base 2100.

The base 2100 may further include a seating recess 2140 for a spring unit (not illustrated), and the seating recess 2140 may be provided with a stepped portion.

In order to attach the base 2100 and the printed circuit board 2500 to each other, the adhesive member 2110 may be provided on one surface of the base 2100. When the amount of the adhesive member 2110 is excessively small, the adhesive force between the base 2100 and the printed circuit board 2500 may be insufficient, causing the printed circuit board 2500 to be separated from the base 2100. When the amount of the adhesive member 2110 is excessively large, the adhesive member 2110 may be introduced into the seating recess 2140, thus making it difficult for the spring unit (not illustrated) to be accurately coupled to the seating recess 2140.

Therefore, the seating recess 2140 of the base 2100 may be provided with the stepped portion in order to inhibit the adhesive member 2110 from being introduced into the seating recess 2140.

The stepped portion may include at least one side surface portion 2143 forming the side surface of the stepped portion, a lower surface portion 2142 forming the lower surface of the stepped portion, and a stepped space 2141 defined by the side surface portion 2143 and the lower surface portion 2142 for accommodating therein the adhesive member 2110.

The lower surface portion 2142 of the stepped space 2141 may have a planar cross-sectional shape.

In addition, the cross section of the lower surface portion 2142 of the stepped space 2141 may be convex in the first direction, which is orthogonal to the lower surface portion 2142.

When the cross section of the lower surface portion 2142 of the stepped space 2141 is convex in the first direction, which is orthogonal to the lower surface portion 2142, the adhesive member 2110 is guided so as to be gathered to opposite sides of the lower surface portion 2142, which may effectively inhibit the adhesive member 2110 from being introduced into the seating recess 2140.

In addition, the cross section of the lower surface portion 2142 of the stepped space 2141 may be concave in the first direction, which is orthogonal to the lower surface portion 2142.

When the cross section of the lower surface portion 2142 of the stepped space 2141 is concave in the first direction, which is orthogonal to the lower surface portion 2142, the adhesive member 2110 is guided so as to be gathered to the center of the lower surface portion 2142, which may effectively inhibit the adhesive member 2110 from being introduced into the seating recess 2140.

In addition, the cross section of the lower surface portion 2142 of the stepped space 2141 may have a sinusoidal shape.

When the cross section of the lower surface portion 2142 of the stepped space 2141 has a sinusoidal shape, the adhesive member 2110 is guided so as to be gathered to a plurality of recesses formed in the lower surface portion 2142, which may effectively inhibit the adhesive member 2110 from being introduced into the seating recess 2140.

Although only one single stepped portion is illustrated in the present embodiment, a plurality of stepped portions may be provided.

Because the provision of the plurality of stepped portions ensures the provision of a plurality of spaces in which the adhesive member 2110 may be accommodated, the introduction of the adhesive member 2110 into the seating recess 2140 may be more effectively inhibited.

A plurality of protruding members may protrude upward from the lower surface portion 2142 by a predetermined height.

Because the protruding members, provided on the lower surface portion 2142, increase resistance in the flow of the adhesive member 2110 introduced into the stepped space 2141, the introduction of the adhesive member 2110 from the stepped space 2141 into the seating recess 2140 may be more effectively inhibited.

Although the protruding members may have a semispherical shape, this is merely given by way of example, and the protruding members 2144 may have a conical shape or a polygonal shape.

The base 2100 may function as a sensor holder for protecting the image sensor. In this case, a downwardly protruding portion may be formed along the side surface of the base 2100. However, this may be not necessary, and although not illustrated, a separate sensor holder may be located below the base 2100.

Figure 8:
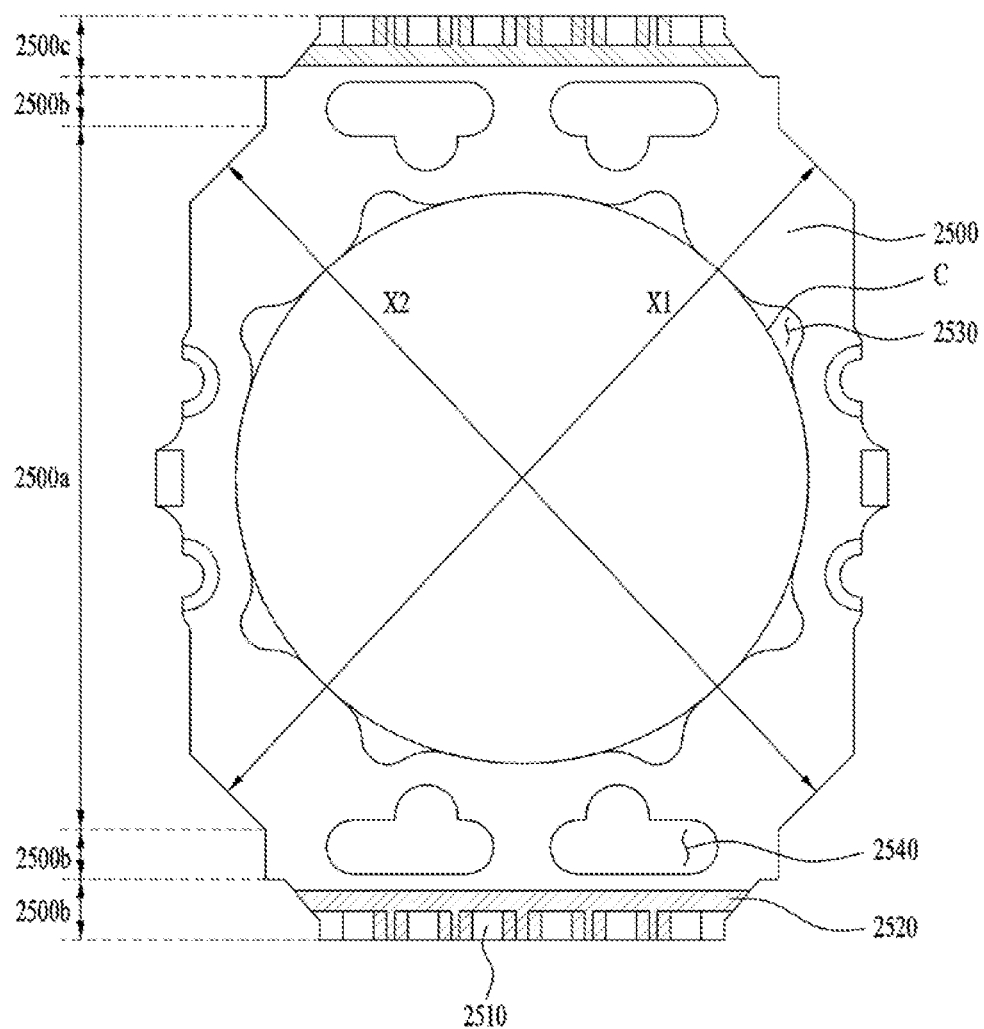
FIG. 8 illustrates the upper surface of the printed circuit board according to the embodiment.

FIG. 8 illustrates the upper surface of the printed circuit board according to the embodiment, and FIG. 9 illustrates the lower surface of the printed circuit board according to the embodiment.

Referring to FIGS. 8 and 9, the printed circuit board 2500 of the embodiment includes a first printed-circuit-board portion 2500a, which has a hollow shape in order to accommodate the bobbin, a second printed-circuit-board portion 2500b, which extends from at least one side of the first printed-circuit-board portion 2500a and is bendable, and a third printed-circuit-board portion 2500c, which extends from at least one side of the second printed-circuit-board portion 2500b and includes a terminal 2510 for electrical communication between the printed circuit board 2500 and a controller (not illustrated).

The first printed-circuit-board portion 2500a may have a hollow shape such that the center thereof defines the circumference C.

In addition, the first printed-circuit-board portion 2500a having a hollow shape may include one or more protruding hollowed portions 2530, which are formed in the inner circumferential surface of the first printed-circuit-board portion 2500a so as to protrude radially outward.

The protruding hollowed portions 2530 may form recesses in the inner circumferential surface of the first printed-circuit-board portion 2500a.

In the lens driving apparatus of the embodiment, the printed circuit board 2500 may be provided on the upper surface of the base 2100, and a circuit member 2310 may be provided on the upper surface of the printed circuit board 2500.

In other words, in the lens driving apparatus of the embodiment, the base 2100, the printed circuit board 2500, and the circuit member 2310 may be stacked one above another in sequence from the bottom side. When the first printed-circuit-board portion 2500a is not provided with the protruding hollowed portions 2530, the circuit member 2310 may come into surface contact with the printed circuit board 2500.

When the circuit member 2310 comes into surface contact with the printed circuit board 2500, and in turn the printed circuit board 2500 comes into surface contact with the base 2100, a protruding member (not illustrated) provided on the upper surface of the base 2100 may come into surface contact with the printed circuit board 2500, rather than coming into contact with the circuit member 2310.

With this structure, the height from the lower surface of the base 2100 to one surface of the circuit member 2310 may vary depending on the thickness of the printed circuit board 2500, which may make it difficult to maintain the consistent quality of the lens driving unit.

However, when the first printed-circuit-board portion 2500*a* is provided with the protruding hollowed portions 2530, the aforementioned protruding member (not illustrated) provided on the upper surface of the base 2100 may penetrate the protruding hollowed portions 2530 to thereby come into contact with the circuit member 2310.

Thereby, the height from the lower surface of the base 2100 to one surface of the circuit member 2310 may be consistently maintained.

As illustrated in the drawings, in a coordinate system, the origin of which is the center of the first printed-circuit-board portion 2500*a*, a total of eight protruding hollow portions 2530 may be provided in such a manner that two are provided in the first quadrant, two are provided in the second quadrant, two are provided in the third quadrant, and two are provided in the fourth quadrant.

This is merely given by way of example, and the shape, position, and number of protruding hollow portions 2530 may be altered in various ways by the user depending on the shape of the base 2100, and the scope of the embodiment is not limited thereby.

The first printed-circuit-board portion 2500*a* may have a first diagonal length X1 based on the center thereof.

In addition, the first printed-circuit-board portion 2500*a* may have a second diagonal length X2 based on the center thereof, which crosses the first diagonal length X1.

The first diagonal length X1 and the second diagonal length X2 may be the same as each other.

On the other hand, the first diagonal length X1 and the second diagonal length X2 may differ from each other.

In addition, the first diagonal length X1 and the second diagonal length X2 may be orthogonal to each other, or may not be orthogonal to each other.

The circuit member 2310 may be stacked on one surface of the printed circuit board 2500, and the first diagonal length X1 of the printed circuit board 2500 may be the same as the first diagonal length X1 of the circuit member 2310.

In addition, the second diagonal length X2 of the printed circuit board 2500 may be the same as the second diagonal length X2 of the circuit member 2310.

In addition, both the first diagonal length X1 and the second diagonal length X2 of the printed circuit board 2500 may be the same as the first diagonal length X1 and the second diagonal length X2 of the circuit member 2310.

When the first diagonal length X1 and/or the second diagonal length X2 of the printed circuit board 2500 is the same as the first diagonal length X1 and/or the second diagonal length X2 of the circuit member 2310, the distortion of the circuit member 2310 or the printed circuit board 2500 may be inhibited in the state where the circuit member 2310 is stacked on one surface of the printed circuit board 2500, which may improve the quality of the camera module.

The second printed-circuit-board portion 2500*b* may extend from one surface of the first printed-circuit-board portion 2500*a*. More specifically, the second printed-circuit-board portion 2500*b* may extend from opposite surfaces of the first printed-circuit-board portion 2500*a* in opposite directions.

The second printed-circuit-board portion 2500*b* may bend in order to enable the electrical-communication between the first printed-circuit-board portion 2500*a* and the third printed-circuit-board portion 2500*c*, which extends from the second printed-circuit-board portion 2500*b* as will be described below, and the controller (not illustrated).

Accordingly, the second printed-circuit-board portion 2500*b* may be formed of a Flexible Printed Circuit Board (FPCB).

The first printed-circuit-board portion 2500*a*, the second printed-circuit-board portion 2500*b*, and the third printed-circuit-board portion 2500*c* may be integrally formed with one another.

Accordingly, in addition to the second printed-circuit-board portion 2500*b*, the first printed-circuit-board portion 2500*a* and the third printed-circuit-board portion 2500*c* may also be formed of a flexible printed circuit board.

Each of the second printed-circuit-board portion 2500*b* and the third printed-circuit-board portion 2500*c* may include at least one elastic member opening 2540, which provides an accommodation space for the arrangement of a hand-tremor-prevention elastic member (not illustrated). The hand-tremor-prevention elastic member provides elastic force to an optical module, which moves in the second and third directions, which are orthogonal to the first direction, which is parallel to the optical axis, in order to inhibit the user's hand tremor.

Four elastic member openings 2540 may be provided. This is merely given by way of example, and the number of elastic member openings 2540 may be changed depending on the number of hand-tremor-prevention elastic members (not illustrated) required in the lens driving unit. The shape and size of the elastic member openings 2540 may also be altered depending on the user's requirements, and the scope of the embodiments is not limited thereby.

The third printed-circuit-board portion 2500*c* may include at least one terminal 2510 provided so as to be electrically connected to the controller (not illustrated), and a coating member 2520 provided to cover the third printed-circuit-board portion 2500*c* and a portion of the terminal 2510.

The terminal 2510 and the coating member 2520 will be described below in detail with reference to FIGS. 10 and 11.

Figure 10:
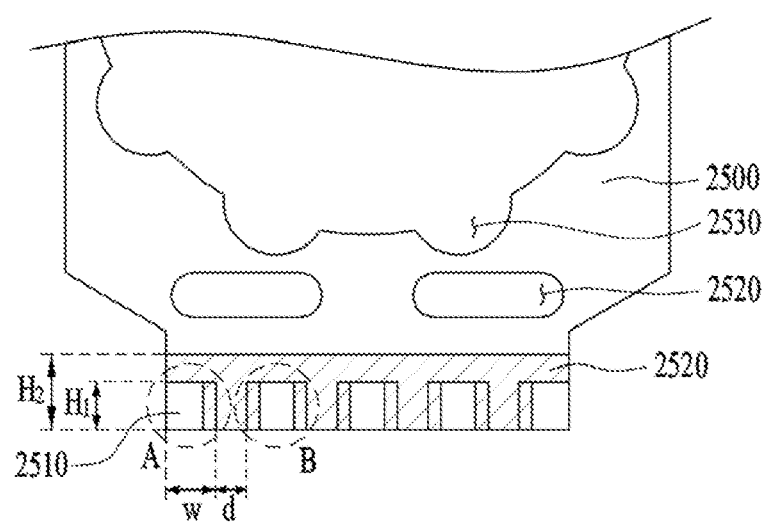
FIG. 10 is a detailed view illustrating a third printed-circuit-board portion 250c of the printed circuit board according to the embodiment.

FIG. 10 is a detailed view illustrating the third printed-circuit-board portion 2500*c* according to the embodiment.

Referring to FIG. 10, the third printed-circuit-board portion 2500*c* may include a plurality of terminals 2510 on one surface thereof. The terminals 2510 may protrude from the third printed-circuit-board portion 2500*c* by a first length.

More specifically, the first length may be 400 μm or more.

When a portion of the printed circuit board 2500 and the controller (not illustrated) come into contact with each other to establish electrical connection therebetween, cracks may be generated in the terminals 2510. When the length that the terminals 2510 protrude from the third printed-circuit-board portion 2500*c* is 400 μm or more, the generation of cracks in the terminals 2510 may be inhibited, which results in improved reliability and quality of the camera module.

Each of the terminals 2510 may have a horizontal length W and a height H. In some embodiments, the terminals 2510 may have the same horizontal length and the same height, or may have different horizontal lengths and different heights.

The terminals 2510 may include first terminals A located on opposite ends of the third printed-circuit-board portion 2500*c*, and second terminals B located between the two first terminals A.

The terminals 2510 may be spaced apart from one another on the third printed-circuit-board portion 2500*c* by a second length d.

The coating member 2520 may be located on a portion of each terminal 2510 and over the gap corresponding to the second length d between the terminals 2510.

When the coating member 2520 is located on a portion of each terminal 2510 and over the gap between the terminals 2510, the thickness of the third printed-circuit-board portion 2500c from the lower surface may be increased by a predetermined height.

Therefore, when the printed circuit board 2500 is assembled, assembly tolerance may be minimized, and consequently, deterioration in quality due to contact failure may be inhibited.

In addition, the second length d may be 0.01 μm.

With the distance of 0.01 μm between the terminals 2510, when the printed circuit board 2500 is assembled in the state where the coating member 2520 is applied on at least two terminals 2510, it is possible to inhibit a portion of each terminal 2510 from being separated from the printed circuit board 2500.

The coating member 2520 may be formed of a Photo Solder Resist (PSR) or cover layer material.

The PSR material is generally applied in order to inhibit the bridging of solder upon soldering after elements are mounted on a circuit board and to inhibit oxidation of an exposed circuit.

Figure 11:
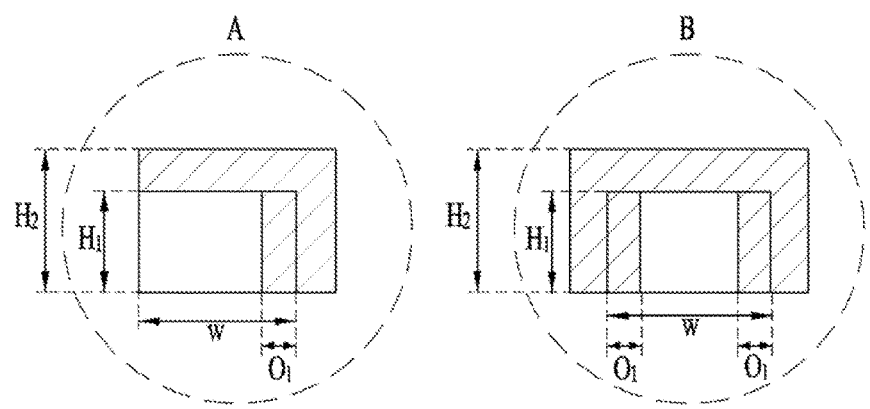
FIG. 11 illustrates a first terminal and a second terminal according to the embodiment, which are placed on the third printed-circuit-board portion 250c.

FIG. 11 illustrates the first terminal A and the second terminal B placed on the third printed-circuit-board portion 2500c according to the embodiment.

Hereinafter, the coating member 2520 disposed on the first terminal A and the second terminal B will be described with reference to FIG. 11.

As described above, the first terminals A may be located on opposite ends of the third printed-circuit-board portion 2500c, and the second terminals B may be located between the two first terminals A so as to be spaced apart from one another.

The coating member 2520 disposed on each first terminal A may be applied to only one end of the first terminal A.

More specifically, the first terminal A may have a horizontal length W, and the coating member 2520 may introduce the first terminal A from one end thereof by a third length $O_1$.

That is, when the overall area of the first terminal A is $H_1 \times W$, the area of the first terminal A over which the coating member 2520 is located may be $O_1 \times H_1$, and the area of the first terminal A over which no coating member 2520 is located may be $(W-O_1) \times H_1$.

The coating member 2520 disposed on the second terminal B may be applied to opposite ends of the second terminal B.

More specifically, the second terminal B may have a horizontal length W, and the coating member 2520 may intrude the second terminal B from opposite ends thereof by the length of $2 \times O_1$.

That is, when the overall area of the second terminal B is $H_1 \times W$, the area of the second terminal B over which the coating member 2520 is located may be $2 \times (O_1 \times H_1)$, and the area of the second terminal B over which no coating member 2520 is located may be $(W-2 \times O_1) \times H_1$.

In addition, the coating member 2520 may be disposed on a portion of the upper surface of each terminal 2510.

In addition, the coating member 2520 may be disposed on a portion of opposite side surfaces of the terminal 2510 and a portion of the upper surface of the terminal 2510.

This is merely given by way of example, and it is sufficient for the coating member 2520 to be applied to two neighboring terminals 2510 so as to inhibit a portion of each terminal 2510 from being separated from the third printed-circuit-board portion 2500c. The position and area of the coating member 2520 and the like may be altered depending on the user's requirements, and the scope of the embodiment is not limited thereby.

Figure 12:
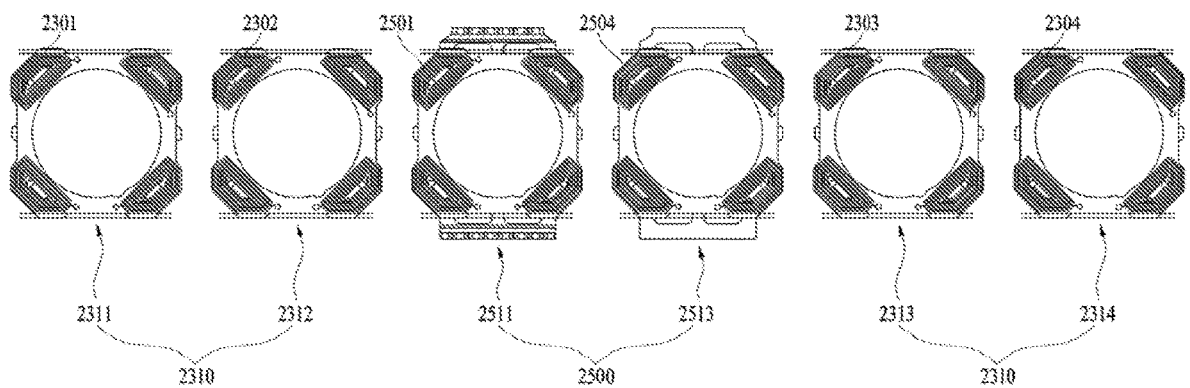
FIG. 12 is an exploded view illustrating a printed circuit board and a circuit member including a second coil according to an embodiment.

FIG. 12 is an exploded view of the printed circuit board 2500 and the circuit member 2310 according to an embodiment.

Referring to FIG. 12, the circuit member 2310 and the printed circuit board 2500 of the embodiment may be integrally formed with each other.

More specifically, the circuit member 2310 may include an uppermost first circuit member 2311, a second circuit member 2312 located below the first circuit member 2311, a third circuit member 2313 located below the second circuit member 2312, and a fourth circuit member 2314 located below the third circuit member 2313.

The printed circuit board 2500 may include a first circuit board 2511 located below the second circuit member 2312 and a second circuit board 2513 located below the first circuit board 2511.

The first to fourth circuit members 2311, 2312, 2313 and 2314 may respectively include second circuit member coils 2301, 2302, 2303 and 2304, which perform hand tremor compensation by moving a housing in the second and/or third directions via the electromagnetic interaction with a first magnet.

The first circuit board 2511 and the second circuit board 2513 may respectively include second circuit board coils 2501 and 2504, which perform hand tremor compensation by moving the housing in the second and/or third directions via the electromagnetic interaction with the first magnet.

Each of the second circuit member coils 2301, 2302, 2303 and 2304 wound on the first to fourth circuit members 2311, 2312, 2313 and 2314 may have five turns or more.

Although FIG. 12 illustrates that the second circuit member coil 2304 is wound on the fourth circuit member 2314, the second circuit member coil 2304 may not be wound on the fourth circuit member 2314 and a position sensor (not illustrated) may be mounted on a portion of the fourth circuit member 2314 at a position corresponding to the second circuit member coil 2304.

The position of the position sensor is not limited to the fourth circuit member 2314, at least one of the circuit member 2310 and the printed circuit board 2500 may not be provided with the second circuit member coils 2301, 2302, 2303, and 2304 and/or the second circuit board coils 2501 and 2504, and a position sensor (not illustrated) may be mounted on a position corresponding to any one of the second circuit member coils 2301, 2302, 2303, and 2304 and/or the second circuit board coils 2501 and 2504.

Each of the second circuit board coils 2501 and 2504, wound on the first circuit board 2511 and the second circuit board 2513, may have five turns or more.

Expressing the configuration of the lens driving apparatus in a different way, in an embodiment, the circuit members 2310 and the printed circuit board 2500 may include a first circuit board unit 2511 and 2513, which includes at least one pattern unit for electrical connection with the controller (not illustrated), a second circuit board unit 2311 and 2312, which is disposed above the first circuit board unit 2511 and 2513, and a third circuit board unit 2313 and 2314, which is disposed below the first circuit board unit 2511 and 2513.

The first circuit board unit 2511 and 2513, the second circuit board unit 2311 and 2312, and the third circuit board unit 2313 and 2314 may include second coils 2301, 2302, 2501, 2504, 2303 and 2304.

In addition, the circuit member 2310, the printed circuit board 250 and the second coils 2301, 2302, 2501, 2504, 2303 and 2304 may be integrally formed with each other. The number of turns of the second circuit member coils 2301, 2302, 2303 and 2304 and the second circuit board coils 2501 and 2504, wound on the first to fourth circuit members 2311, 2312, 2313 and 2314, the first circuit board 2511 and the second circuit board 2513, is merely given by way of example, and the number of turns of the second circuit member coils 2301, 2302, 2303 and 2304 and the second circuit board coils 2501 and 2504 may be altered depending on the user's requirements, and the scope of the embodiment is not limited thereby.

In summary, the lens driving apparatus of the embodiment may include the circuit member 2310 and the printed circuit board 2500, and the circuit member 2310 and the printed circuit board 2500 may include the first circuit board unit 2511 and 2513, which includes at least one pattern unit for the electrical connection with the controller, the second circuit board unit 2311 and 2312 disposed above the first circuit board unit 2511 and 2513, and the third circuit board unit 2313 and 2314 disposed below the first circuit board unit 2511 and 2513.

The first circuit board unit 2511 and 2513, the second circuit board unit 2311 and 2312, and the third circuit board unit 2313 and 2314 may include the second coils 2301, 2302, 2303, 2304, 2501 and 2504, which perform hand tremor compensation by moving the housing in the second and/or third directions via the electromagnetic interaction with the first magnet.

Each of the second coils 2301, 2302, 2303, 2304, 2501 and 2504, wound on the first circuit board unit 2511 and 2513, the second circuit board unit 2311 and 2312, and the third circuit board unit 2313 and 2314, may have five turns or more.

Each of the first circuit board unit 2511 and 2513, the second circuit board unit 2311 and 2312, and the third circuit board unit 2313 and 2314 may include a plurality of circuit boards.

More specifically, the second circuit board unit 2311 and 2312 may include a first circuit board 2311 and a second circuit board 2312.

The first circuit board unit 2511 and 2513 may include a third circuit board 2511 and a fourth circuit board 2513.

The third circuit board unit 2313 and 2314 may include a fifth circuit board 2313 and a sixth circuit board 2314.

Although FIG. 12 illustrates that the second coil 2304 is wound on the sixth circuit board 2314, the second coil 2304 may not be wound on the sixth circuit board 2314, and a position sensor (not illustrated) may be mounted on a portion corresponding to the position of the second coil 2304.

The position of the position sensor is not limited to the sixth circuit board 2314, at least one of the first to sixth circuit boards 2311, 2312, 2511, 2513, 2313 and 2314 may not be provided with the second coils 2301, 2302, 2303, 2304, 2501 and 2504, and a position sensor (not illustrated) may be mounted on a portion corresponding to the position of each of the second coils 2301, 2302, 2303, 2304, 2501 and 2504. As described above, the number of turns of each of the second coils 2301, 2302, 2303, 2304, 2501 and 2504 wound on the first to sixth circuit boards 2311, 2312, 2511, 2513, 2313 and 2314 is given by way of example, and may be altered in various ways depending on the user's requirements, and the scope of the embodiment is not limited thereby.

Figure 13:
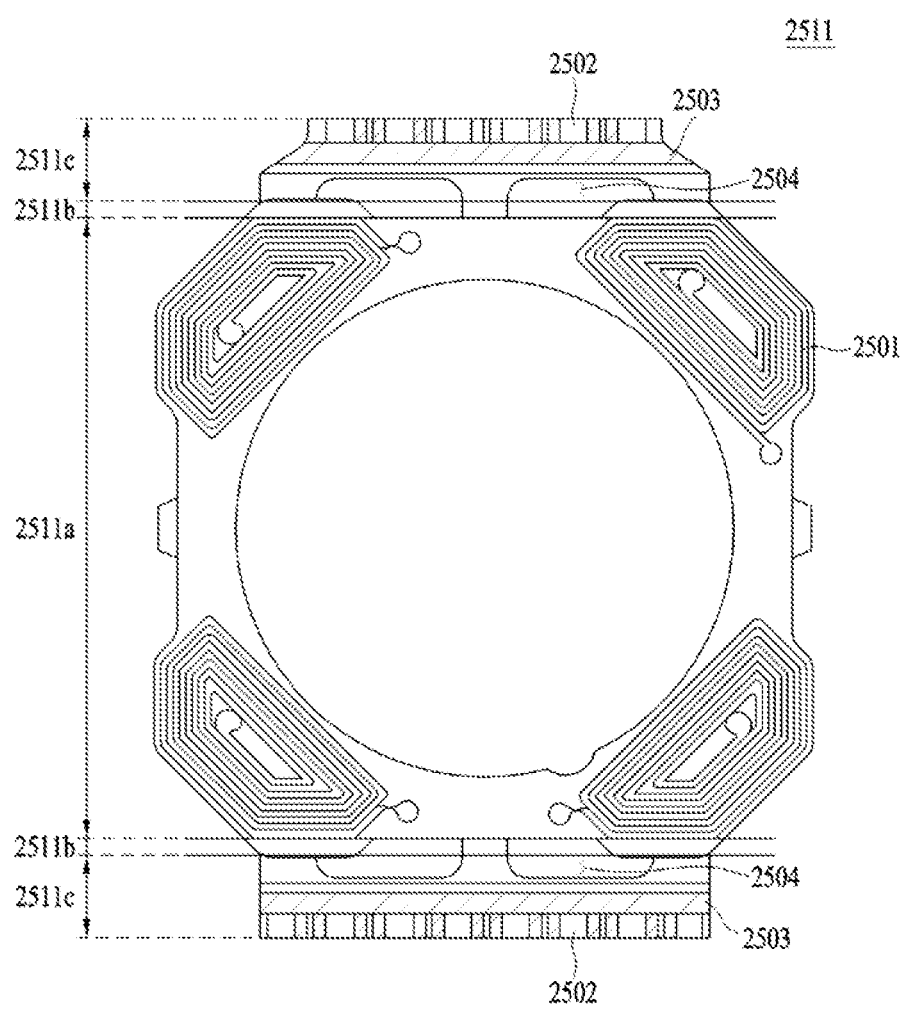
FIG. 13 illustrates a first circuit board according to the embodiment.

The lens driving apparatuses illustrated in FIGS. 8 and 13 illustrates the embodiments in which the printed circuit board 2500 and the circuit member 2310 are not integrally formed with each other and the circuit member 2310 is assembled to the upper surface of the printed circuit board 2500.

When the printed circuit board 2500 and the circuit member 2310 are not integrally formed with each other and the circuit member 2310 is assembled to the upper surface of the printed circuit board 2500, as described above, the circuit member 2310 may be tilted in the process of being assembled on the printed circuit board 2500, which may cause deterioration in the quality of the camera module.

In addition, a foreign substance may be introduced in the process of assembling the circuit member 2310 on the printed circuit board 2500, which may cause deterioration in the quality of the camera module.

Figure 14:
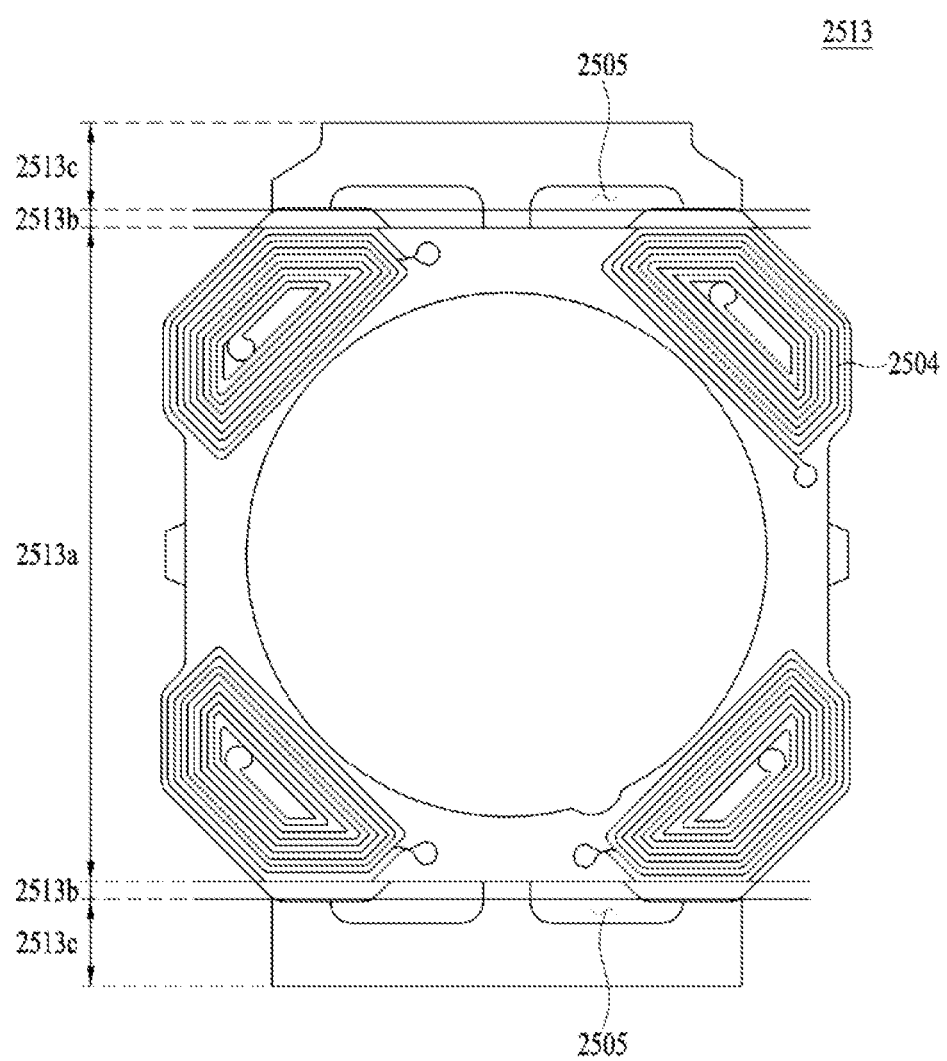
FIG. 14 illustrates a second circuit board according to the embodiment.

Therefore, the lens driving apparatus of the embodiment illustrated in FIGS. 12 to 14 has the feature by which the printed circuit board 2500 and the circuit member 2310 are integrally formed with each other in order to solve the problems described above.

When the circuit member 2310 and the printed circuit board 2500 are integrally formed with each other according to the embodiment, as described above, the process of assembling the circuit member 2310 on the printed circuit board 2500 may be omitted, which may increase productivity.

In addition, when the circuit member 2310 and the printed circuit board 2500 are integrally formed with each other according to the embodiment, as described above, there is no process of assembling the circuit member 2310 on the printed circuit board 2500, which may inhibit deterioration in the quality of the camera module due to the tilting of the circuit member 2310.

In addition, the circuit member 2310 and the printed circuit board 2500, which are integrally formed with each other, according to the embodiment may inhibit a foreign substance from being introduced therebetween, which may improve the quality of the camera module.

FIG. 13 illustrates the first circuit board according to the embodiment.

Referring to FIG. 13, the first circuit board 2511 of the embodiment may include a first-first printed-circuit-board portion 2511a, which has a hollow shape in order to accommodate the bobbin, a first-second printed-circuit-board portion 2511b, which extends from at least one side of the first-first printed-circuit-board portion 2511a and is bendable, and a first-third printed-circuit-board portion 2511c, which extends from at least one side of the first-second printed-circuit-board portion 2511b and includes a pattern 2502 for the electrical-communication between the printed circuit board 2500 and the base 2100.

The first-first printed-circuit-board portion 2511a may have a hollow shape such that the center thereof is the circumference C.

The first-second printed-circuit-board portion 2511b may extend from one surface of the first-first printed-circuit-board portion 2511a, and more specifically, may extend from opposite surfaces of the first-first printed-circuit-board portion 2511a in opposite directions.

The first-second printed-circuit-board portion 2511b may be provided so as to bend, in order to ensure the electrical-communication between the first-first printed-circuit-board portion 2511a and the first-third printed-circuit-board portion 2511c, which extends from the first-second printed-circuit-board portion 2511b as described below, and the base 2100.

Accordingly, the first-second printed-circuit-board portion 2511b may be formed of a Flexible Printed Circuit Board (FPCB).

The first-first printed-circuit-board portion 2511a, the first-second printed-circuit-board portion 2511b, and the first-third printed-circuit-board portion 2511c may be integrally formed with one another.

Accordingly, in addition to the first-second printed-circuit-board portion 2511b, the first-first printed-circuit-board portion 2511a and the first-third printed-circuit-board portion 2511c may be formed of a flexible printed circuit board.

Each of the first-second printed-circuit-board portion 2511b and the first-third printed-circuit-board portion 2511c may include at least one first elastic member opening 2504, which provides an accommodation space for the arrangement of a hand-tremor-prevention elastic member (not illustrated). The hand-tremor-prevention elastic member provides elastic force to an optical module, which moves in the second and third directions, which are orthogonal to the first direction, which is parallel to the optical axis, in order to inhibit the user's hand tremor.

Four first elastic member openings 2504 may be provided. This is merely given by way of example, and the number of first elastic member openings 2504 may be changed depending on the number of hand-tremor-prevention elastic members (not illustrated) required in the lens driving unit. The shape and size of the first elastic member openings 2504 may also be altered depending on the user's requirements, and the scope of the embodiments is not limited thereby.

The first-third printed-circuit-board portion 2511c may include at least one pattern 2502 provided so as to be electrically connected to the base 2100, and a coating member 2503 provided to cover the first-third printed-circuit-board portion 2511c and a portion of the pattern 2502.

FIG. 14 illustrates the second circuit board according to the embodiment.

Referring to FIG. 14, the second circuit board 2513 of the embodiment may include a second-first printed-circuit-board portion 2513a, which has a hollow shape in order to accommodate the bobbin, a second-second printed-circuit-board portion 2513b, which extends from at least one side of the second-first printed-circuit-board portion 2513a and is bendable, and a second-third printed-circuit-board portion 2513c, which extends from at least one side of the first-second printed-circuit-board portion 2511b.

The second-first printed-circuit-board portion 2513a may have a hollow shape such that the center thereof is the circumference C.

The second-second printed-circuit-board portion 2513b may extend from one surface of the second-first printed-circuit-board portion 2513a, and more specifically, may extend from opposite surfaces of the second-first printed-circuit-board portion 2513a in opposite directions.

The second-second printed-circuit-board portion 2513b may be provided so as to bend, in order to ensure the electrical-communication between the second-first printed-circuit-board portion 2513a and the second-third printed-circuit-board portion 2513c, which extends from the second-second printed-circuit-board portion 2513b as described below, and the base 2100.

Accordingly, the second-second printed-circuit-board portion 2513b may be formed of a Flexible Printed Circuit Board (FPCB).

The second-first printed-circuit-board portion 2513a, the second-second printed-circuit-board portion 2513b, and the second-third printed-circuit-board portion 2513c may be integrally formed with one another.

Accordingly, in addition to the second-second printed-circuit-board portion 2513b, the second-first printed-circuit-board portion 2513a and the second-third printed-circuit-board portion 2513c may be formed of a flexible printed circuit board.

Each of the second-second printed-circuit-board portion 2513b and the second-third printed-circuit-board portion 2513c may include at least one second elastic member opening 2505, which provides an accommodation space for the arrangement of a hand-tremor-prevention elastic member (not illustrated). The hand-tremor-prevention elastic member provides elastic force to an optical module, which moves in the second and third directions, which are orthogonal to the first direction, which is parallel to the optical axis, in order to inhibit the user's hand tremor.

Four second elastic member openings 2505 may be provided. This is merely given by way of example, and the number of second elastic member openings 2505 may be changed depending on the number of hand-tremor-prevention elastic members (not illustrated) required in the lens driving unit. The shape and size of the second elastic member openings 2505 may also be altered depending on the user's requirements, and the scope of the embodiments is not limited thereby.

As is apparent from the above description, reduced manufacturing costs may be accomplished owing to a reduction in the number of elements, processes, and process management points.

In addition, the height of an entire product may be reduced, resulting in a reduced product size.

In addition, a lens driving apparatus and a camera module including the same according to an embodiment may inhibit deterioration in the quality of the camera module due to warping of a printed circuit board, which is caused when a circuit member is assembled to one surface of the printed circuit board because the printed circuit board and the circuit member have different sizes.

In addition, a lens driving apparatus and a camera module including the same according to an embodiment may inhibit contact failure due to a gap between a pad unit provided on one surface of a printed circuit board and a base to which the printed circuit board is assembled.

In addition, a lens driving apparatus and a camera module including the same according to an embodiment may inhibit deterioration in the quality of the camera module due to the separation of a portion of a pad from a printed circuit board during soldering in the case where only a pad unit is provided on one surface of the printed circuit board.

In addition, a lens driving apparatus and a camera module including the same according to an embodiment may inhibit a circuit member from having an irregular height because it does not come into contact with a base when the circuit member, the base, and a printed circuit board are sequentially assembled with one another so that the printed circuit board is provided on one surface of the base and the circuit member is provided on one surface of the printed circuit board.

In addition, a lens driving apparatus and a camera module including the same according to an embodiment may inhibit a pattern, which protrudes from a pad provided on one surface of a printed circuit board, from being cracked by an external shock when the pattern is thin.

In addition, a lens driving apparatus and a camera module including the same according to an embodiment may inhibit a circuit member from being slightly tilted in the process of assembling the circuit member so as to be disposed on the top of a printed circuit board.

In addition, a lens driving apparatus and a camera module including the same according to an embodiment may inhibit deterioration in the resolution of the camera module when a circuit member is tilted, rather than being evenly disposed on the upper surface of a printed circuit board.

In addition, a lens driving apparatus and a camera module including the same according to an embodiment may inhibit deterioration in the resolution of the camera module due to the introduction of a foreign substance between a circuit member and a printed circuit board because the circuit member and the printed circuit board are assembled with each other, rather than being integrally formed with each other.

In the above description, although all elements of the embodiments have been described as being coupled or operated in the coupled state thereof, the disclosure is not limited to these embodiments. That is, one or more elements among all of the embodiments may be selectively coupled and operated so long as this configuration falls within the objective range of the embodiments. In addition, the terms "comprises," "includes," and/or "has", when used in this specification, specify the presence of stated elements, but do not preclude the presence or addition of other elements. Unless otherwise defined, all terms (including technical and scientific terms) used herein have the same meaning as commonly understood by one of ordinary skill in the art to which the embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The above description merely describes the technical sprit of the embodiments by way of example, and various modifications and substitutions related to the above description are possible by those skilled in the art without departing from the scope and spirit of the disclosure. Accordingly, the disclosed embodiments are provided for the purpose of description and are not intended to limit the technical scope of the disclosure, and the technical scope of the disclosure is not limited by the embodiments. The range of the disclosure should be interpreted based on the following claims, and all technical ideas that fall within the range equivalent to the claims should be understood as belonging to the scope of the disclosure.

The invention claimed is:

1. A lens driving unit comprising:
a housing;
a bobbin disposed in the housing;
a magnet disposed on the housing;
a coil disposed on the bobbin and configured to move the bobbin in an optical axis direction by an interaction with the magnet;
an upper support member coupled to an upper portion of the bobbin and an upper portion of the housing;
a lateral support member coupled to the upper support member and configured to support the housing;
a pattern coil part comprising a body disposed under the housing and a pattern coil formed on the body and configured to move the housing by an interaction with the magnet; and
a sensor part configured to sense a movement of the housing and disposed on a lower surface of the body.

2. The lens driving unit according to claim 1, wherein the body comprises a first layer and a second layer disposed on the first layer and the sensor part is disposed underneath the first layer, and the pattern coil is formed on the second layer.

3. The lens driving unit according to claim 1, wherein the body comprises a through-hole and the pattern coil is disposed between the through-hole and an outer side surface of the body.

4. The lens driving unit according to claim 1, wherein the magnet comprises four magnet units disposed on four side portions of the housing, and the pattern coil comprises four coil portions corresponding to the four magnet units.

5. The lens driving unit according to claim 1, wherein the sensor part overlaps the pattern coil in the optical axis direction.

6. The lens driving unit according to claim 1, comprising a base disposed under the body of the pattern coil part.

7. The lens driving unit according to claim 6, wherein the lateral support member is coupled to the base.

8. The lens driving unit according to claim 6, wherein the base comprises a recess formed in an upper surface thereof, and the sensor part is disposed in the recess.

9. The lens driving unit according to claim 1, wherein the lateral support member is a wire.

10. The lens driving unit according to claim 9, wherein the lateral support member is disposed at a corner portion of the housing.

11. The lens driving unit according to claim 1, wherein the sensor part comprises a hall sensor configured to sense the magnet.

12. The lens driving unit according to claim 11, wherein the sensor part comprises a first hall sensor and a second hall sensor spaced apart from each other.

13. The lens driving unit according to claim 1, wherein the upper support member comprises two upper electrical conduction parts, and
wherein the coil is electrically connected to the two upper electrical conduction parts.

14. The lens driving unit according to claim 1, comprising:
a lower support member coupled to a lower portion of the bobbin and a lower portion of the housing; and
a cover member configured to accommodate the housing.

15. The lens driving unit according to claim 1, wherein the upper support member comprises an outer side portion coupled to the housing, an inner side portion coupled to the bobbin, and a connection portion connecting the outer side portion and the inner side portion.

16. A camera module comprising:
a lens;
the lens driving unit according to claim 1; and
an image sensor.

17. A lens driving unit comprising:
a base;
a pattern coil part disposed on the base and comprising a first layer, a second layer disposed on the first layer and a pattern coil formed on the second layer;
a housing disposed on the pattern and spaced apart from the pattern coil part;
a bobbin disposed in the housing;
a magnet disposed on the housing and configured to move the housing horizontally by an interaction with the magnet; and
a sensor part disposed on a lower surface of the first layer of the pattern coil part and configured to sense a movement of the housing.

18. The lens driving unit according to claim 17, comprising a coil disposed on the bobbin and configured to move the bobbin in an optical axis direction by an interaction with the magnet.

19. The lens driving unit according to claim 17, comprising:
- an upper support member coupled to an upper portion of the bobbin and an upper portion of the housing; and
- a lateral support member coupled to the upper support member and configured to support the housing.

20. The lens driving unit according to claim 17, wherein the lateral support member comprises a wire disposed at a corner portion of the housing.

* * * * *